(12) United States Patent
Bouchard et al.

(10) Patent No.: US 7,965,821 B2
(45) Date of Patent: Jun. 21, 2011

(54) METHOD, SYSTEM AND APPARATUS FOR CONTROLLING A VOICE RECORDER

(75) Inventors: Jean Bouchard, Sillery (CA); Claude Jacques Parent, Ottawa (CA); Damani Jason Best, Montreal (CA)

(73) Assignee: BCE Inc., Verdun, Quebec (CA)

( * ) Notice: Subject to any disclaimer, the term of this patent is extended or adjusted under 35 U.S.C. 154(b) by 1301 days.

(21) Appl. No.: 11/462,870

(22) Filed: Aug. 7, 2006

(65) Prior Publication Data

US 2007/0047693 A1 Mar. 1, 2007

(30) Foreign Application Priority Data

Aug. 8, 2005 (CA) .................................. 2515629
Dec. 22, 2005 (CA) .................................. 2531552

(51) Int. Cl.
*H04M 1/64* (2006.01)
(52) U.S. Cl. .... 379/68; 370/260; 379/88.01; 379/114.2; 379/265.11; 380/283; 455/410; 710/58
(58) Field of Classification Search .................... 379/35, 379/68, 85, 112.01, 188, 191, 88.19, 133, 379/265.06, 88.01, 114.2, 265.11; 380/283; 455/410; 710/58; 370/260
See application file for complete search history.

(56) References Cited

U.S. PATENT DOCUMENTS

| | | | | |
|---|---|---|---|---|
| 5,535,261 A | * | 7/1996 | Brown et al. ............... | 379/88.11 |
| 5,692,034 A | * | 11/1997 | Richardson et al. ......... | 379/67.1 |
| 5,949,852 A |  | 9/1999 | Duncan | |
| 5,982,857 A | * | 11/1999 | Brady ......................... | 379/88.19 |
| 5,995,824 A |  | 11/1999 | Whitfield | |
| 6,052,454 A | * | 4/2000 | Kek et al. ...................... | 379/188 |
| 6,078,648 A | * | 6/2000 | Albers et al. ..................... | 379/35 |
| 6,233,313 B1 | * | 5/2001 | Farris et al. ............... | 379/112.01 |
| 6,393,113 B1 | * | 5/2002 | Karras ........................... | 379/133 |
| 6,404,857 B1 | * | 6/2002 | Blair et al. .................... | 379/67.1 |
| 6,529,602 B1 | * | 3/2003 | Walker et al. ................. | 380/283 |
| 6,760,420 B2 |  | 7/2004 | Heilmann et al. | |

(Continued)

FOREIGN PATENT DOCUMENTS

EP 1 343 121 A2 9/2003

OTHER PUBLICATIONS

Eventide, Network Access Software, http://www.eventide.com/loggers/naweb/ntwkacc.htm, Oct. 2002, 5 pages.

(Continued)

*Primary Examiner* — Gerald Gauthier

(57) ABSTRACT

According to an embodiment on the present invention, a method for controlling a voice recorder is disclosed. The voice recorder is for recording a voice session between an origination device and a destination device. The method can be conveniently executed at a computing apparatus coupled to the origination device and to the voice recorder. The method comprises receiving at least one of a user identifier associated with a user of the origination device and a destination identifier associated with the destination device. The method further comprises generating a voice recording trigger using at least one of data associated with the user identifier and data associated with the destination identifier. The voice recording trigger is then transmitted to the voice recorder to enable the voice recorder to control recording of the voice session between the origination device and the destination device.

83 Claims, 17 Drawing Sheets

U.S. PATENT DOCUMENTS

| | | | |
|---|---|---|---|
| 6,920,209 B1* | 7/2005 | Gainsboro | 379/188 |
| 6,987,841 B1* | 1/2006 | Byers et al. | 379/88.17 |
| 7,023,979 B1* | 4/2006 | Wu et al. | 379/265.11 |
| 7,043,008 B1* | 5/2006 | Dewan | 379/265.06 |
| 7,058,163 B1* | 6/2006 | Parekh et al. | 379/85 |
| 7,551,732 B2* | 6/2009 | Anders | 379/191 |
| 2001/0036821 A1* | 11/2001 | Gainsboro et al. | 455/410 |
| 2002/0090073 A1 | 7/2002 | Heilmann et al. | |
| 2002/0168060 A1 | 11/2002 | Huie | |
| 2003/0133552 A1* | 7/2003 | Pillai et al. | 379/114.2 |
| 2004/0160896 A1 | 8/2004 | Luna et al. | |
| 2005/0014491 A1 | 1/2005 | Johnson | |
| 2005/0185638 A1 | 8/2005 | Begis | |
| 2005/0226395 A1* | 10/2005 | Benco et al. | 379/85 |
| 2006/0143336 A1* | 6/2006 | Stroobach et al. | 710/58 |
| 2006/0285650 A1 | 12/2006 | Hodge | |
| 2007/0047693 A1* | 3/2007 | Bouchard et al. | 379/67.1 |
| 2007/0047694 A1* | 3/2007 | Bouchard et al. | 379/67.1 |
| 2010/0226287 A1* | 9/2010 | Horvath et al. | 370/260 |

OTHER PUBLICATIONS

Office Action issued by the United States Patent and Trademark Office on Sep. 30, 2010 in connection with U.S. Appl. No. 11/462,888, 45 pages.

Office Action issued by the United States Patent and Trademark Office on Feb. 10, 2011 in connection with U.S. Appl. No. 11/462,888, 54 pages.

Eventide, Network Access Software, http://www.eventide.com/loggers/naweb/ntwkacc.htm, Oct. 2002, 5 pages.

Eventide, Network Access, VR320 Logging Recorder Configuration, http://www.eventide.com/pdfs/ntwkacc.pdf, published at least as early as Nov. 14, 2006, 14 pages.

Eventide, Series VR778 Advanced Technology Logging & Archiving System, http://eventide.com/vr778/vr778sales.pdf, published at least as early as Nov. 14, 2006, 5 pages.

Cartel Communications Systems Inc., Products—Communications & Control Product Division—Eventide Inc., http://www.cartelsys.com/cfm/index.cfm?Pg=1659&Lp=1196&Db, published at least as early as Nov. 14, 2006, 2 pages.

Travis Voice & Data, VOIP and Telephone Systems for your Business, Eventide the next step, http://www.travisvoice.com/eventide.asp, published at least as early as Nov. 14, 2006, 4 pages.

Oak, ProAgent—Entry level professional voice recording, http://www.oak.co.uk/CMS/Files/Brochures/ProAgent.pdf, published at least as early as Nov. 14, 2006, 1 page.

* cited by examiner

| First Network Identifier 310 | Second Network Identifier 312 |
| --- | --- |
| 525-555-6254 | 193.75.14.76 |
| 555-666-7788 | 65.24.17.123 |
| 765873 | 9.1.7.54 |
| 92.1.75.66 | 777-888-1122 |

FIG 3

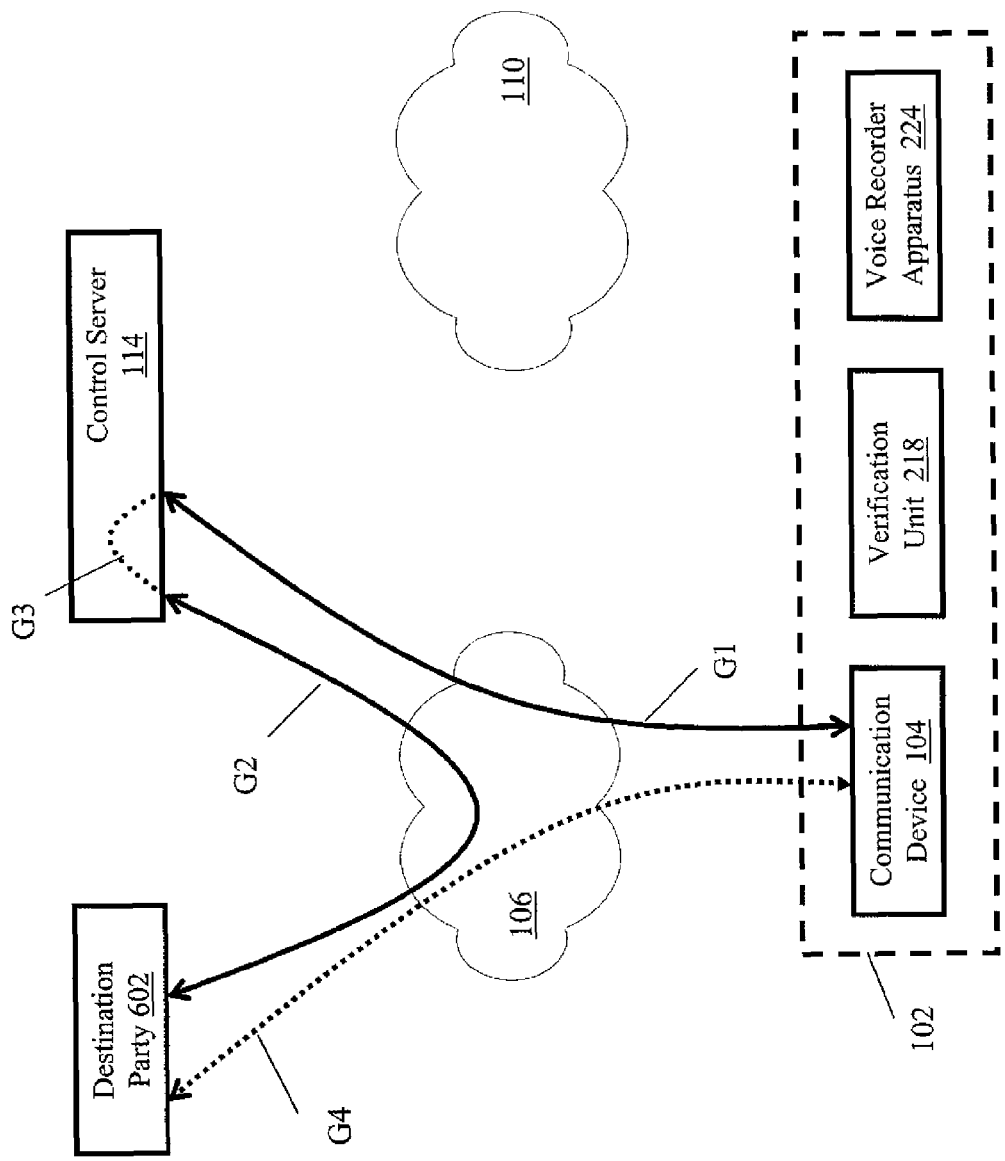

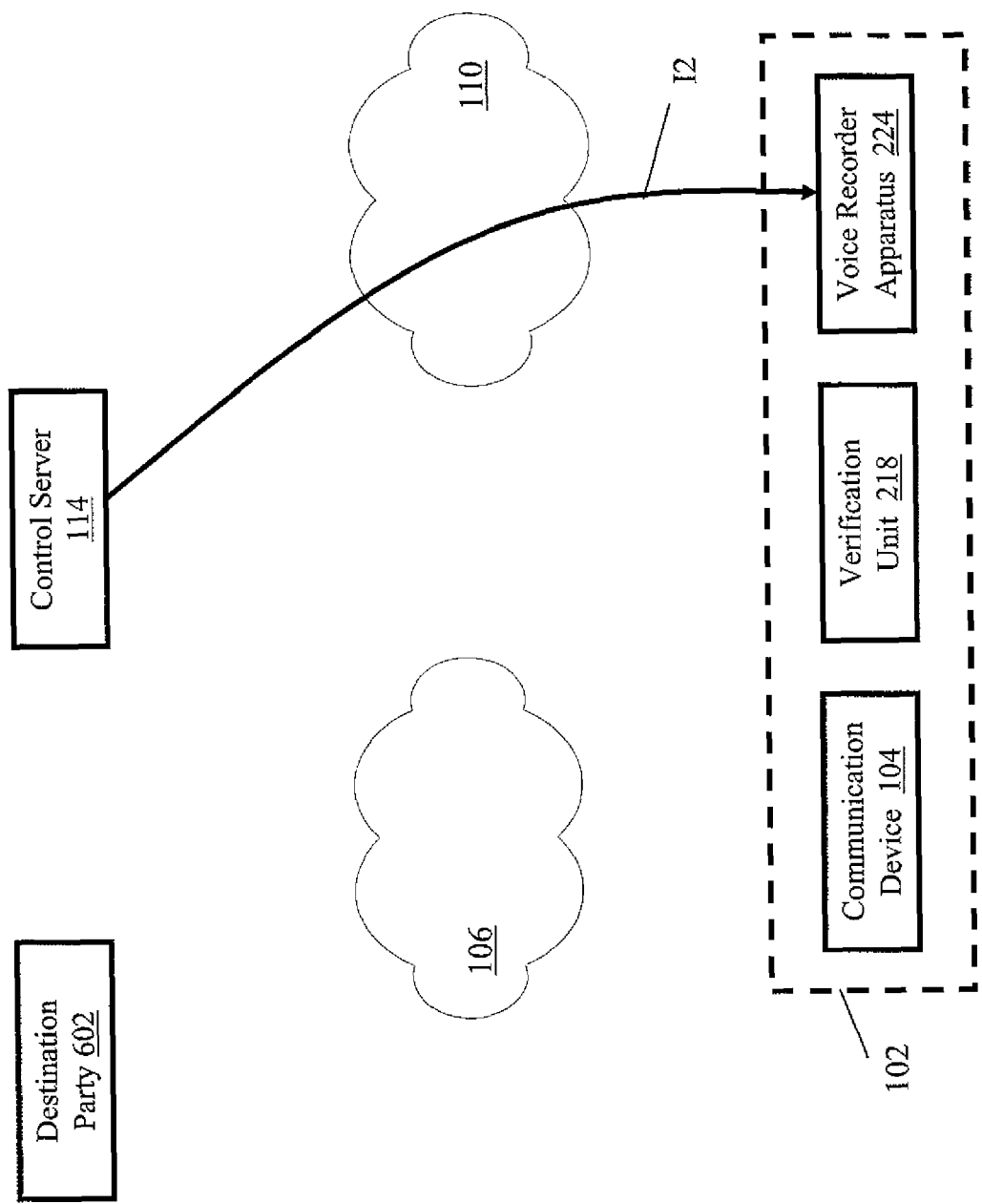

METHOD, SYSTEM AND APPARATUS FOR CONTROLLING A VOICE RECORDER

FIELD OF THE INVENTION

This invention relates generally to communication networks and more specifically to a method, system and apparatus for controlling a voice recorder.

BACKGROUND OF THE INVENTION

People have become accustomed to using phones for making voice and data calls and generally expect to be able to make telephone calls virtually everywhere. Wireless phones and other wireless devices have enabled people to make phone calls while on the go. Even though wireless networks cover all major urban and rural areas, there are certain areas where wireless communication devices are not permitted to be used, such as in hospitals, certain areas of airports, certain restaurants, entertainment areas, art centres, certain controlled environments (ex. correctional facilities and the like) and certain highly secured facilities (such as data centres and the like). In these circumstances, people still rely on wireline-based communication systems.

Furthermore, there is a plethora of circumstances when an organization desires to control outbound calls made from its premises. For example, corporations usually restrict long distance and overseas calling from phones located in common areas of the office, such as a reception, floor access phones, cafeteria phones, loading docks and the like. Other corporations restrict overseas calling from employees' desk phones and allow overseas calling after entering a PIN code as a measure to combat unauthorized expenses.

Additional problems arise with controlling outbound calling from controlled institutions, such as correctional institutions, military bases and the like. In the example of correctional institutions, the telephone system must meet certain requirements. The phone hardware itself must be more robust than standard pay phones and must be able to withstand not only weather hazards such as the case with outside payphones, but also potential physical abuse and tampering.

Furthermore, correctional institutions usually impose certain restrictions on the type of calls that can be placed by inmates. For example, inmates can only be allowed to make calls to a certain list of numbers, which has to be pre-approved. This is done in order to avoid harassing and unwanted calls from inmates to ex-victims or other targeted groups. Typically, each inmate has a list of allowed telephone numbers to which he or she is allowed to place outbound calls. Such lists include lawyer's numbers, government organizations, various help lines, religious organizations and approved relatives' telephone numbers. As a result, it is important to positively identify each inmate before allowing him or her to place an outbound telephone call.

One solution to identify callers is available from QuorTech Solutions Inc. of 110-7777 P10th Street NE, Calgary, Alberta Canada. The pay phones used in the Millennium Inmate Systems establish a connection with a server via the Public Switched Telephone Network, identify the caller using a PIN entered using the pay phone keypad and verify that the inmate identified with the PIN is authorized to call the particular dialled number. The Millennium Inmate System establishes a collect call to the authorized destination number. Several limitations are associated with the Millennium Inmate System. For example, inmates are only able to make outbound collect calls and are not allowed to make direct outbound calls to the authorized numbers since there is no option to perform a billing function. Furthermore, no further authentication of inmates' identity is provided for and inmates can easily share PINs in order to obtain access to other inmate's allowed call lists.

SUMMARY OF THE INVENTION

The invention addresses at least one of the above stated needs and mitigates at least one of the stated problems.

According to a first broad aspect, the present invention is a method for controlling a voice recorder, the voice recorder for recording a voice session between an origination device and a destination device. The method can be executed at a computing apparatus coupled to the origination device and to the voice recorder. The method comprises receiving at least one of a user identifier associated with a user of the origination device and a destination identifier associated with the destination device; generating a voice recording trigger using at least one of the user identifier and the destination identifier; and transmitting the voice recording trigger to the voice recorder to enable the voice recorder to control recording of the voice session between the origination device and the destination device.

According to a second broad aspect, the present invention is a method for controlling a voice recorder, the voice recorder for recording a voice session between an origination device and a destination device. The method can be executed at a computing apparatus coupled to the origination device and to the voice recorder. The method comprises receiving at least one of a user identifier associated with a user of the origination device and a destination identifier associated with the destination device; determining if the voice session should be recorded based on at least one of the user identifier and the destination identifier; and in response to the determining if the voice session should be recorded, generating a voice recording trigger, the voice recording trigger for enabling the voice recorder to control recording of the voice session between the origination device and the destination device.

According to a third broad aspect, the present invention is an apparatus for controlling a voice recorder, the voice recorder for recording a voice session between an origination device and a destination device. The apparatus comprises a first interface operable to connect to the origination device; a second interface operable to connect to the voice recorder; and a processing unit coupled to the first and second interfaces. The processing unit is operable: to receive, via the first interface, at least one of a user identifier associated with a user of the origination device and a destination identifier associated with the destination device; to generate a voice recording trigger using at least one of the user identifier and the destination identifier; and to transmit the voice recording trigger to the voice recorder via the second interface to enable the voice recorder to control recording of the voice session between the origination device and the destination device.

According to another broad aspect, the present invention is a system for controlling recording of a voice session between an origination device and a destination device. The system comprises a voice recorder coupled to the origination device, the voice recorder operable to record the voice session; and a computing apparatus coupled to the origination device and to the voice recorder.

The computing apparatus operable to:
receive at least one of a user identifier associated with a user of the origination device and a destination identifier associated with the destination device;
generate a voice recording trigger using at least one of the user identifier and the destination identifier;

transmit the voice recording trigger to the voice recorder. The voice recorder being operable to:
receive the voice recording trigger from the computing apparatus; and
responsive to receipt of the voice recording trigger, to control recording of the voice session between the origination device and the destination device.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which:

FIG. 3 is a block diagram illustrating a network identifiers table stored at the control server according to one embodiment of the present invention;

FIGS. 6G and 6H are logical diagrams representing signal flow between components of the system of FIG. 1 during a call connection stage according to two embodiments of the present invention;

FIG. 6I is a logical diagram representing signal flow between components of the system of FIG. 1 during a call recording decision stage according to an embodiment of the present invention.

DETAILED DESCRIPTION OF THE PRESENT INVENTION

Figure 1:
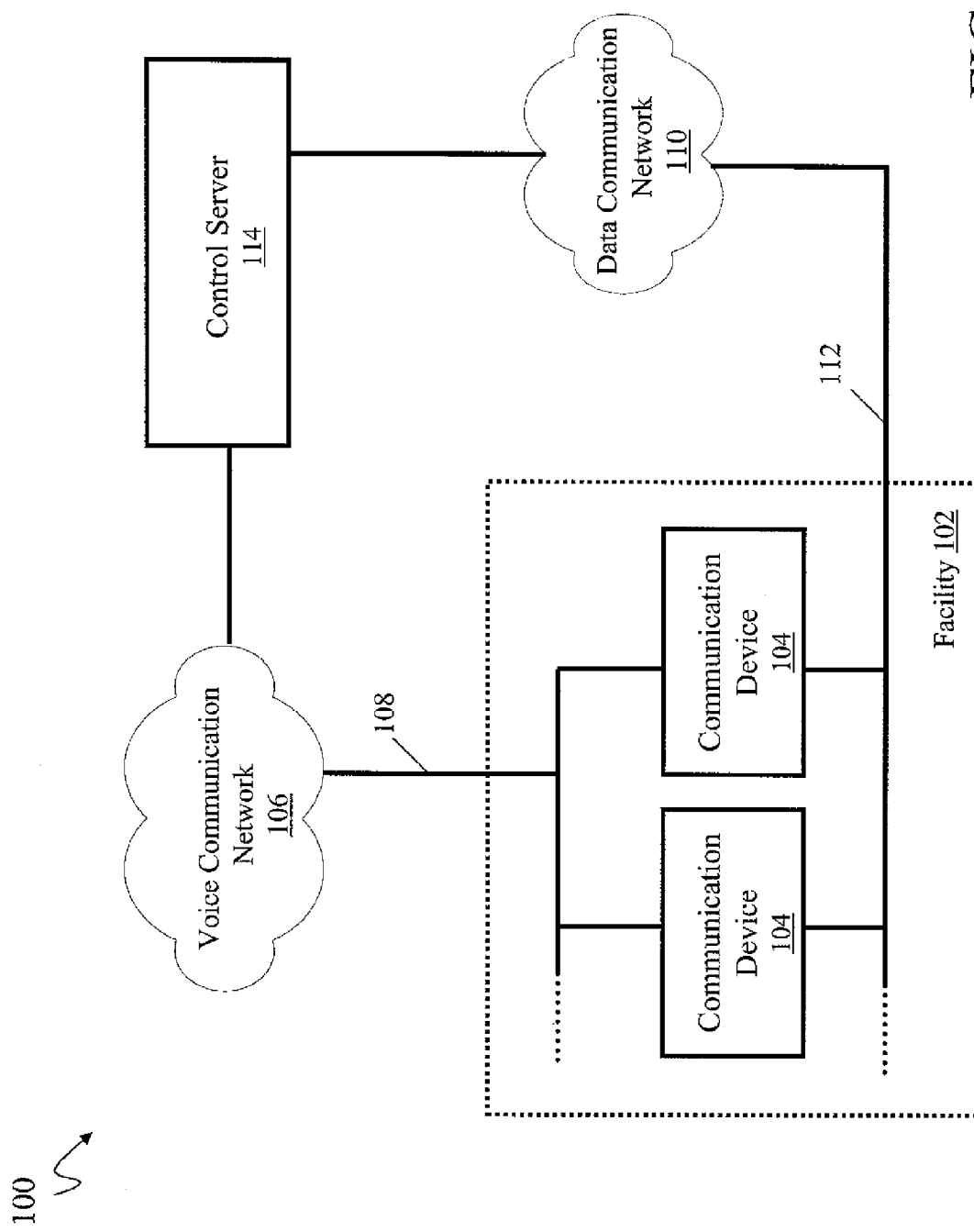
FIG. 1 is a block diagram illustrating a system for controlling an outbound call according to one embodiment of the present invention.

FIG. 1 depicts a block diagram of a system 100 for communicating data associated with a user of a voice communication device according to one embodiment of the present invention. The system 100 comprises a facility generally depicted at 102. The facility 102 can be any facility where control over outbound calls is desired, for instance a correctional facility, a military base, a hospital, an office or the like. Specific non-limiting examples will be made with a reference to the correctional facility, but one should understand that teachings of the present invention equally apply to any other facility.

Within the facility 102 a communication device 104 is located. In should be understood that a plurality of communication devices 104 can be located in a given facility 102 of which only two communication devices 104 are depicted. The communication device 104 can be a pay phone modified in accordance with teachings of this invention as will be described in greater detail herein below. One skilled in the art will appreciate, that the communication device 104 comprises voice input and output means, such as a microphone and speakerphones for facilitating a voice communication. The communication device 104 further comprises various input and output interfaces that are well known in the art, such as a key pad for receiving user selection, a display for displaying messages to the user and the like. It should be understood that in some embodiments (such as presently described in respect to an example of the correctional facility), the communication device 104 can be reinforced to withstand rough handling in the correctional facility. In other embodiments, the communication device 104 can be reinforced to withstand weather (if used in an outside environment).

The system 100 further comprises a voice communication network 106. In some embodiments of the present invention, the voice communication network 106 can be a Public Switched Telephone Network (PSTN). In other embodiments of the present invention, the voice communication network 106 can be a packet based network (such as the Internet or the like) capable of transporting voice packets. One skilled in the art will further appreciate that in other embodiments, the voice communication network 106 can be a wireless network, such as WiMax, CDMA, TDMA, GSM and the like. Yet further alternatives apparent to those of skill in the art are within the scope of this invention. The communication device 104 is coupled to the voice communication network 106 in a manner well known in the art by means of a communication link 108. In some embodiments of the present invention, the communication link 108 can be a twisted pair copper line which is well known in the art. One should understand that any other type of communication link 108 known in the art can be utilized.

The system 100 further comprises a data communication network 110. The data communication network 110 can be a packet-based network (such as the public Intranet, private Intranet, any WAN, LAN or the like) or any other type of data communication network known in the art. The communication device 104 is coupled to the data communication network 110 via a communication link 112. The communication link 112 can be based on DSL technology and in these embodiments the communication link 112 can be partially or completely the same communication link as the communication link 108, i.e. a copper twisted pair. One skilled in the art will appreciate that in this case, the communication link 108 and the communication link 112 depicted in FIG. 1 represent logical links that run at least partially on the same physical link (ex. copper twisted pair). In other embodiments, the communication link 112 can be a cable connection, an Ethernet connection, a wireless connection and the like and as such would be physically separate from the communication link 108. It should be understood that other data connection standards could be utilized for communication link 112.

The system 100 further comprises a control server 114 coupled to the voice communication network 106 and the data communication network 110. In some embodiments of the present invention, the control server 114 is located in a location distinct from that of the facility 102. In other embodiments, the control server 114 can be co-located in the facility 102. It should be understood that the control sever 114 could be dedicated to the facility 102 or alternatively serve a plurality of facilities 102. The control server 114 can be dedicated to provisioning of outbound call control or can be "shared" for provisioning of other applications as well.

In the same manner, the control server 114 can be owned and/or managed by the same entity which owns and/or manages the facility 102. Alternatively, the control server 114 can be owned and/or managed by an entity separate from the one that owns and/or manages the facility 102. As such, the system and method according to the present invention can be outsourced by the management of the facility 102 to a third party service provider.

In some embodiments of the present invention, as will be explained in greater detail below, the communication device 104 is operable to establish a voice communication with the control server 114 via the communication link 108 and the voice communication network 106. The control server 114 is operable to receive the voice communication from the communication device 104 and to determine a first identifier associated with the communication device 104 (such as a Caller Line ID or the like). Based on the first identifier, the control server 114 can determine a second identifier used for communicating with the communication device 104 over the data communication network 110 (which can be an IP address assigned to the communication device 104 or to a component thereof). The control server 114 is operable to obtain additional information from the communication device 104. For instance, the control server 114 can obtain destination information, which in some embodiments is obtained via the voice communication network 106 in form of DTMF tones. The control server 114 can further obtain additional parameters from the communication device 104 (such as user identification and/or user authentication information comprising a smart card number, retina scan information, iris scan information, fingerprint scan information, a hand scan print information, an information derived from a keystroke pattern analysis or the like). The additional parameters can be obtained via the data communication network 110. Based on the destination information, additional parameters, other pre-provisioned parameters and policies or combination thereof, the control server 114 is operable to authorize the outbound telephone call. The control server 114 is further operable to connect the outbound telephone call from the communication device 104 to the destination telephone number via the voice communication network 106. As will be further explained in greater detail below, the control server 114 is further operable to perform billing functions and other administrative functions.

Figure 2A:
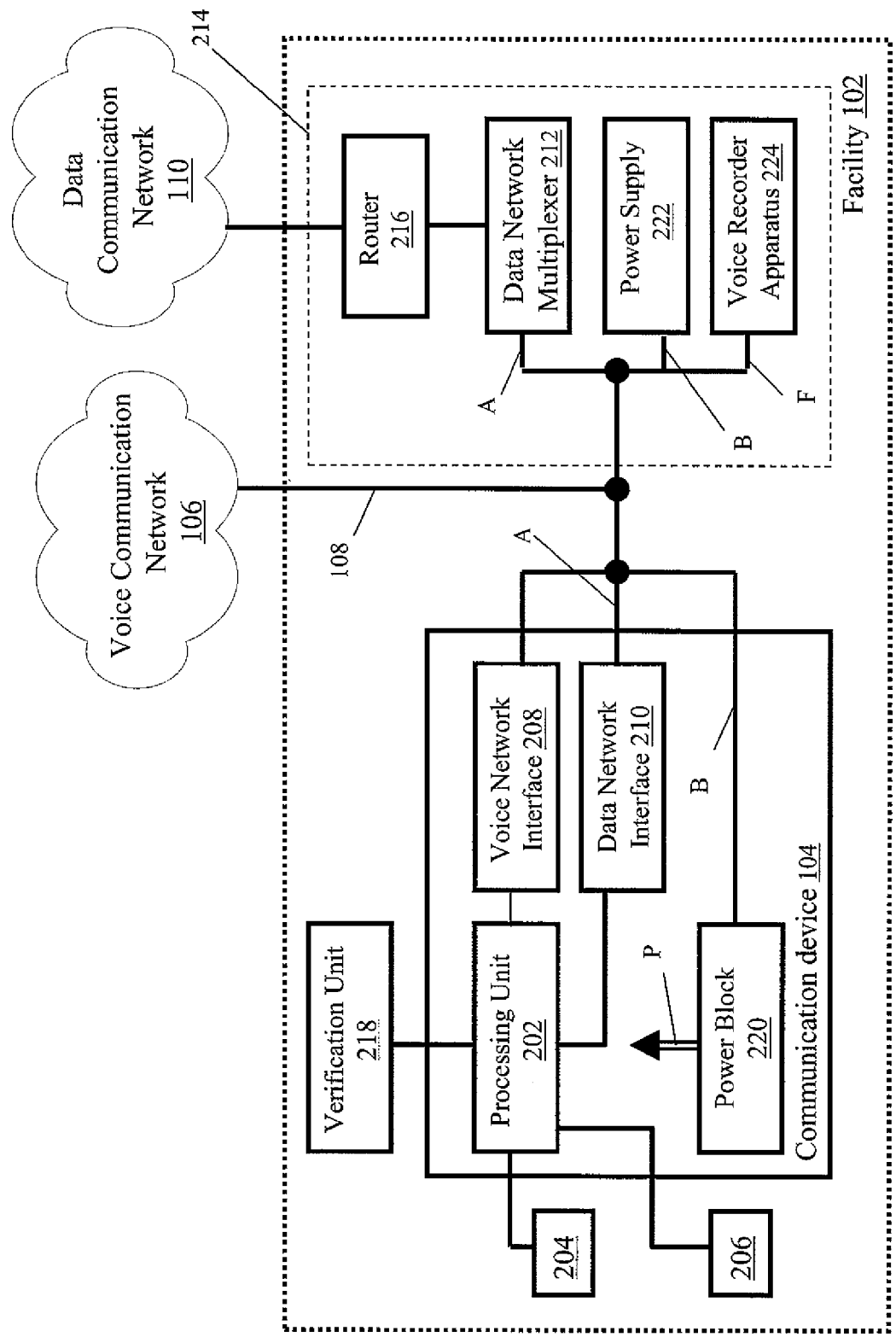
FIG. 2A is a block diagram illustrating elements of the system for controlling an outbound call according to one embodiment of the present invention.

With reference to FIG. 2A a particular embodiment of system 100 will be described. In this embodiment the facility 102 is a correctional facility. It should be understood that the facility 102 can be any other facility where control over outbound calling is desired.

As depicted in FIG. 2A, the communication device 104 can comprise a processing unit 202 that comprises circuitry to process calls, which is known in the art. The processing unit 202 is coupled to an input/output interface 204 for facilitating a voice communication (such as a standard microphone/speaker handset). The input/output interface 204 can further comprise a display for displaying messages to the user. The processing unit 202 is further coupled to a keypad 206 for receiving user selections. One skilled in the art will appreciate that when the user inputs his or her selection using the keypad 206, the processing unit 202 is operable to generate DTMF tones representing the user selection in a manner well known in the art. The processing unit 202, the input/output interface 204 and the keypad 206 in some embodiments of the present invention form a voice device, i.e. a voice device enabling voice communications.

As discussed above, the communication device 104 is coupled to the voice communication network 106 via the communication link 108 for facilitating a voice conversation. To that extent, the communication device 104 comprises a voice network interface 208. It will be recalled that in some embodiments, the voice communication network 106 can be the PSTN and the communication link 108 can be a copper twisted pair link. In these embodiments, the voice network interface 208 can be a standard interface used in Plain Old Telephone Service (POTS) phones well known to those skilled in the art. In other embodiments of the present invention, the voice communication network 106 can be packet-based (such as the public Internet) and in these embodiments, the voice network interface 208 can comprise an Ethernet card, a modem or the like. In the case of DSL technology, the voice network interface 208 can comprise a DSL modem coupled to the copper twisted pair as is well understood by those of skill in the art.

The communication device 104 is further coupled to the data communication network 110 via a data network interface 210. In some embodiments of the present invention, the data network interface 210 can be a modem. In one specific non-limiting example, the modem is a DSL modem, such as modem 4200 distributed by Siemens Corporation of Citicorp Center, 153 East 53rd Street, New York, N.Y. USA. In other embodiments, other modems can be used, such as other DSL modems, cable modems, dial-up modems or the like. In case of communication link 112 being based on DSL technology, the data network interface 210 is connected to a Data Network Multiplexer 212, which can be a Digital Subscriber Line Access Multiplexer (DSLAM). The data network interface 210 can be connected to the Data Network Multiplexer 212 by the communication link 108 using the path marked as A in FIG. 2A. One skilled in the art will appreciate that in these embodiments, the communication link 108 comprises the required filters and splitters (not shown) or the like well known in the art. The Data Network Multiplexer 212 can be located in the facility 102 premises in a secured location to prevent unauthorized access, such as location 214, which can be a cable entry point, a demarcation point, the telecommunication room or the like. The Data Network Multiplexer 212 can be located in any other location of the facility 102 or outside the facility 102 (for example a telephone central office). It should be understood that the Data Network Multiplexer 212 can be coupled to a plurality of communication devices 104 (of which only a single instance of the communication device 104 is depicted in FIG. 2A).

In the embodiments of FIG. 2A, the system 100 further comprises a router 216 coupled to the Data Network Multiplexer 212 and the data communication network 110. The router 216 can be any commercially available router, such as CISCO 837 manufactured and distributed by Cisco Systems, Inc. of 170 West Tasman Dr., San Jose, Calif. USA. Alternatively, any customer edge router can be used and one skilled in the art will appreciate that the exact router used will depend on several parameters, including but not limited to bandwidth, required level of security and the like. One skilled in the art will appreciate that any other device that can interface between the Data Network Multiplexer 212 and the data communication network 110 could be used. As depicted in FIG. 2A, the router 216 can be located on the premises of the facility 102, for instance in the location 214. However, one should understand that in other embodiments, the router 216 can be located in any other location of the facility 102 or outside of the facility 102 (for example, in a telephone central office).

In other embodiments, the communication device 104 can be coupled to the data communication network 110 via a cable connection. One skilled in the art will appreciate that in these embodiments, the data network interface 210 can comprise a cable modem and the Data Network Multiplexer 212 would be replaced by a cable head end (not depicted). In these embodiments, the communication link 112 would be physically distinct from the communication link 108. It should be understood that other connection means can be utilized to couple the communication device 104 to the data communication network 110, such as fiber optics or wireless standards (ex. WiFi or WiMax).

In some embodiments of the present invention, the communication device 104 further comprises a data device, such as a verification unit 218 that is coupled to the processing unit 202. The verification unit 218 can comprise a user identification card reader (such as a smart card reader, a magnetic card reader, an RFID tag reader and the like), a biometric scanner (such as a retina scanner, an iris scanner, a fingerprint scanner, a hand print scanner, a keystroke patter analyzer and the like) or any combination thereof. As will be described in further detail herein below, the purpose of the verification unit 218 is to obtain user identification information and/or user authentication information. The verification unit 218 is operable to collect the user identification information and to transmit the collected user identification information to the processing unit 202 which in turn is operable to transmit it via the data communication network 110 as will be described in greater detail herein below. In alternate embodiments, the verification unit 218 is operable to collect the user information and to transmit the collected user identification information to the processing unit 202 which may perform comparison and verification steps locally (for instance, by comparing the collected user identification information with user identification information stored on a smart card or magnetic card). In other embodiments of the present invention, the verification unit 218 can comprise an identification apparatus (such as a user identification card reader for identifying the user) and an authentication apparatus (for instance a biometric scanner, such as a fingerprint scanner, a retina scanner, an iris scanner or the like for verifying the identity of the user). In other embodiments of the present invention, the verification unit 218 is operable to obtain user identification and/or authentication information and perform user identification, authentication, and authorization locally and transmit an authorization code via the data communication network 110 as will be described in greater detail herein below.

The communication device 104 further comprises a power block 220. The power block 220 can be further coupled directly or indirectly to the processing unit 202, the verification unit 218, the data network interface 210, and other components of the communication device 104 in order to supply the power to components of the communication device 104 (as depicted by arrow P in FIG. 2A). In some embodiments of the present invention, the power block 220 is connected to a power supply 222 by means of a power connection B. In some embodiments of the present invention, the power connection B can utilize spare links within the communication link 108. In other embodiments, the power connection B can be a separate physical cable connecting the power block 220 to the power supply 222. The power supply 222 can be located in location 214, any other designated location within the facility 102 or outside the facility 102. In some embodiments of the present invention, the power supply 222 comprises a transformer that transforms 110V AC power into 12V DC power. In other embodiments, two transformers can be used to provide 24V DC power to the processing unit 202, the data network interface 210, the verification unit 218 as well as other components of the communication device 104. It should be understood that other power arrangements for the communication device 104 are possible and the powering arrangement described should not limit the scope of the present invention. For example, local transformers, batteries, other power techniques known to those skilled in the art or combination thereof could be used.

The communication device 104 can be assigned one or more IP addresses in a manner well known in the art. The at least one IP address is used for the purposes of routing packets to and from the communication device 104 via the data communication network 110. The IP address can be assigned to the processing unit 202, the verification unit 218, the data network interface 210 or other components of the communication device 104. One skilled in the art will appreciate, that each of the processing unit 202, the verification unit 218, the data network interface 210 or other components of the communication device 104 can be assigned a separate IP address distinct from the IP addresses assigned to other components. As will be appreciated by those skilled in the art, the IP address can be static or dynamic. One skilled in the art will further appreciate that in case of the dynamic IP address assignment, the system 100 further comprises an address provision server (such as a DHCP server). The DHCP server can be located in the facility 102, in the control server 114 or at any other place connected to the data communication network 110. In some embodiments of the present invention, Network Address Translation (NAT) can be performed at the Data Network Multiplexer 212 or the router 216 to translate local IP addresses assigned to the plurality of communication device 104 into global IP addresses, as is well known to those of skill in the art Alternatively, the Network Address Translation can be performed at a separate router situated between the Data Network Multiplexer 212 and the communication device 104 (not shown). One skilled in the art will further appreciate that any other type of data connection identifier (other than the IP address) compatible with the data communication network 110 can be used for the purposes of addressing the communication device 104.

In some embodiments of the present invention, the system 100 can further comprise a voice recorder apparatus depicted at 224. The voice recorder apparatus 224 is operable to record calls made to and from the communication device 104. In one specific non-limiting example, the voice recorder apparatus 224 can be coupled to the communication link 108 via a link F. As would be appreciated by those of skill in the art, the voice recorder apparatus 224 can "tap" into the communication link 108. The voice recorder apparatus 224 can comprise any apparatus for monitoring and/or recording voice communications, such as Eventide VR778 manufactured by Eventide Inc. of Little Ferry N.J. USA and distributed in Canada by Cartel Communication System Inc. of 9415-202$^{nd}$ Street, Langley, BC Canada. It should be appreciated that different types of voice recorder apparatus 224 can be used in different facilities 102. As depicted in FIG. 2A, the voice recorder apparatus 224 can be located in the location 214. However, the voice recorder apparatus 224 can also be located in other parts of the facility 102 (such as at the demarcation point, i.e. it can be connected to the phone lines leaving the facility 102) or outside the facility 102 (such as at the control server 114 or any other location. For example, a single centralized voice recorder apparatus 224 connected to the plurality of facilities 102 via the data communication network 110 can be used. The voice recorder apparatus 224 can be assigned a network identifier and have an interface (not depicted) for communication via the data communication network 110. In one embodiment of the present invention, the network identifier can be an IP address. However, any network identifier compatible with the data communication network 110 can be used.

One skilled in the art will appreciate that in certain embodiments of the present invention, connections over the voice communication network 106 and the data communication network 110 can be secure connections. In one specific non-limiting example, communication over the data communication network 110 can utilize VPN-based security solutions. In other embodiments, IP Sec tunnel, PKI-based or any other security solution known in the art can be applied.

The data network interface 210 and the verification unit 218 can be incorporated into the communication device 104 by the manufacturer. At the same time, existing communication devices 104 can be retrofitted with the data network interface 210 and the verification unit 218. For instance, a Millennium 2110V2 Coinless Public Phone manufactured and distributed by QuorTech Solutions Inc. of 13268 James Madison Highway, Orange, Va. USA can be used and retrofitted with the data network interface 210, the verification unit 218 and the power block 220 according to the teachings presented herein. It should be noted that any communication device 104 of a type having a voice device (for supporting a voice connection) and a data device (for supporting a data connection) can be used.

It will be recalled that the system 100 further comprises the control server 114 which will now be explained in greater detail with reference to FIG. 2B. The control server 114 comprises a voice processing apparatus 226, a call control apparatus 228, an administrative control module 230 and a profile database 232 interconnected by a LAN 234. The voice processing apparatus 226 comprises an interface 236 for connecting to the voice communication network 106. The LAN 234 is further coupled to the data communication network 110 via a router 238. The router 238 can be similar to the router 216, though any other interface that can enable the LAN 234 to be coupled to the data communication network 110 can be used.

One should appreciate that the profile database 232 can be hosted in other locations of the system 100. For instance, in some embodiments of the present invention the profile database 232 can be hosted on the verification unit 218 and can be accessed by the call control apparatus 228 via the data communication network 110. Alternatively, the profile database 232 can be hosted in any other place of the system 100 and can be accessed via the data communication network 110.

The voice processing apparatus 226 is operable to receive a call via the voice communication network 106, to initiate a call via the voice communication network 106, to detect DTMF tones via the voice communication network 106, to receive Caller Line ID (CLID) information of the calling party, to synthesize voice, to play back audio files (such as .WAV files or the like), to perform text to voice translation and voice recording. Other functions performed by the voice processing apparatus 226 will become apparent to those skilled in the art having regard to the teachings of this invention. In one embodiment, the voice processing apparatus 226 can comprise an HP Proliant DL380 G2 Telephony Server (Dual CPU 1.4 GHz Intel Pentium III, RAM 2 Gigs) manufactured by Hewlett-Packard Company of 3000 Hanover Street Palo Alto, Calif. USA, an 2 NMS CG6000 card manufactured by NMS Communications of 100 Crossing Boulevard, Framingham, Mass. USA with the RedHat Linux Enterprise Edition 3 WS software distributed by RedHat Corporation of 1801 Varsity Drive, Raleigh, N.C. USA.

Even though the voice processing apparatus 226 has been described as being operable to perform a plurality of functions in some embodiments of the present inventions, it should be understood that in other embodiments of the present invention, some of these function may be performed at other devices. For instance, the speech to voice conversion can be performed at a separate device. In these embodiments, the voice processing apparatus 226 is operable to transmit a text file to a separate text to speech device via the LAN 234 and/or the data communication network 110 and receive back the translated file (ex. a .WAV file) containing the audio representing the text.

The call control apparatus 228 is coupled to the voice processing apparatus 226 via the LAN 234 and is operable to control the voice processing apparatus 226, as will be described in greater detail herein below.

The profile database 232 comprises a network identifiers table 300 depicted in FIG. 3. As depicted in FIG. 3, the sample network identifiers table 300 comprises information correlating a first network identifier 310 and a second network identifier 312. In one specific non-limiting example, the first network identifier 310 can be a telephone number (ex. CLID information) associated with the communication device 104. The second network identifier 312 can be an IP address assigned to the verification unit 218 (or the communication device 104 or any other component of the communication device 104) for the purposes of communication over the data communication network 110. In other embodiments, the first network identifier 310 can be the IP address of the verification unit 218 and the second network identifier 312 can be the telephone number of the communication device 104. In yet further embodiments, the first network identifier 310 can be any network identifier used for identification of the communication device 104 for the purposes of communication over the voice communication network 106 and the second network identifier 312 can be any network identifier used for addressing the verification unit 218 (or the communication device 104 or any other component of the communication device 104) for the purposes of communication over the data communication network 110. For example and with reference to FIG. 3, the telephone number associated with the communication device 104 could be 525-555-6254 and the IP address associated with the verification unit 218 could be 193.75.14.76. In another example, the first network identifier can be a MAC address associated with the communication device 104 (such as 765873) and the corresponding second network identifier associated with the verification unit 218 can be an IP address such as 9.1.7.54. As will be discussed in greater detail herein below, the call control apparatus 228 is operable to access the profile database 232 to retrieve entries from the network identifiers table 300. For example, the call control apparatus 228 can access the profile database 232 and retrieve an IP address associated with the verification unit 218 based on the telephone number (for example, from the CLID information) associated with the communication device 104 and vice versa.

The profile database 232 can comprise further tables (not depicted) that can contain information for billing purposes (such as call durations, etc.), call records per user and the like. In some embodiments of the present invention, the profile database 232 further comprises a plurality of user profile tables which will now be explained in greater detail with reference to FIG. 4. As discussed above, in some embodiments of the present invention, the facility 102 can be a correctional facility and in these cases, the system 100 is used to control outbound calls made by inmates. As will be appreciated by those skilled in the art, controlling calls from a correctional facility involves controlling several parameters of the call, including but not limited to allowed destination telephone numbers, call durations, call transfers, call forwarding, call times and the like. Under certain circumstances, it may be required to record the conversation for law enforcement agencies (subject to Court Orders). Furthermore, it may be desirable to block DTMF tones on the line, for example in order to prevent the inmate from performing three-way calling as will be described in greater detail below. Under yet further circumstances, it may be desirable to allow the inmate to use DTMF tones, for instance for navigating Interactive Voice Response (IVR) systems commonly used in government and other organizations.

Figure 4:
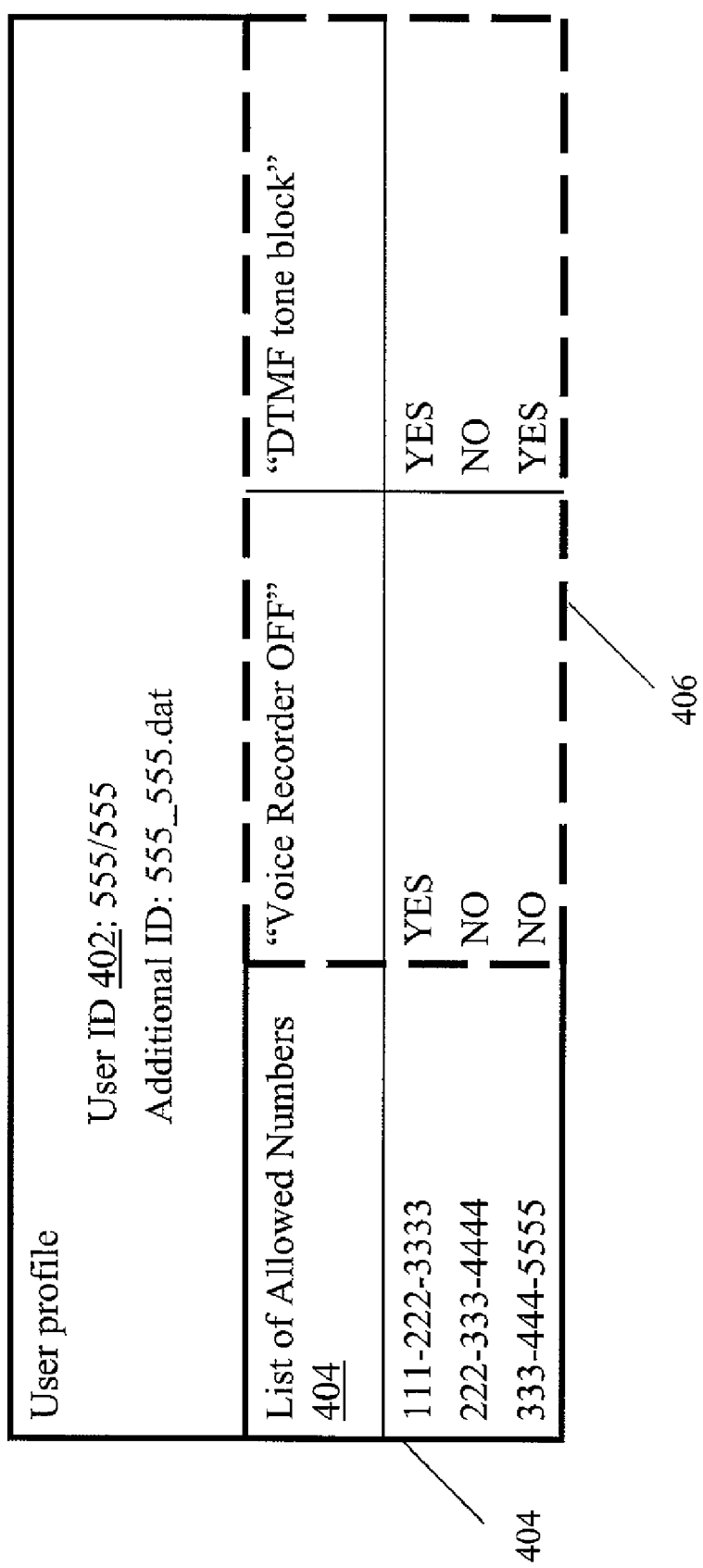
FIG. 4 is a user profile stored at the control server according to one embodiment of the present invention.

A sample of a user profile 400 is depicted in FIG. 4. The user profile 400 can be maintained for each user of the system. Alternatively, a single master user profile 400 can be maintained for all users in the facility 102. The user profile 400 comprises a user identification 402. In one specific non-limiting example, the user identification 402 can be a smart card identifier associated with a personal user identification card (such as a smart card, a magnetic stripe card, and RFID tag and the like) issued to each inmate for the purposes of identifying himself or herself for the use of inmate services, such as pay phones. As was discussed above, the verification unit 218 can comprise a user identification card reader for ascertaining the smart card identifier. In other examples, the user identification can comprise an identifier derived from a finger print, an iris scan or a retina scan obtained by the verification unit 218. In some embodiments of the present invention, the user identification 402 can additionally comprise a PIN number issued to each inmate that can be used in addition or instead of the smart card number, retina, iris or fingerprint scans. One skilled in the art will appreciate that any combination of these or other identifiers can be used for the purposes of the present invention.

The user profile table 400 further comprises a list of allowed numbers 404 and associated parameters 406 for each of the allowed numbers 404. The list of allowed numbers 404 typically comprises telephone numbers of the inmate's relatives, lawyer, priest, as well as numbers of various support organizations and help lines. The list of allowed numbers 404 further includes numbers of government organizations. For each number listed in the list of allowed numbers 404 the associated parameters 406 are listed. In one specific non-limiting example, two associated parameters 406 are specified: "voice record OFF" and "DTMF tone block".

As will be appreciated by those skilled in the art, Court orders may be issued to record conversations of certain inmates. However, certain calls placed by these inmates (for instance, those to their lawyers or legal aid) can not be recorded for various legal reasons. The "voice record OFF" tag used in the associated parameter 406 can be used for those telephone numbers to which the voice recording Court order does not apply. In this case, the voice recorder apparatus 224 will not record conversations during the call to the excluded number. If no Court order has been issued for recording voice conversations of a particular inmate, all "voice record OFF" tags can be provisioned as "YES" thus instructing the voice recorder apparatus 224 not to record any conversations for a particular inmate. In other embodiments, a master voice record tag may be provided (not depicted) and the "voice record OFF" tag may be used to identify exception numbers (i.e. those numbers to which calls should not be recorded or vice versa). In yet further embodiments of the present invention, the associated parameters 406 do not comprise the "voice record OFF" tag and the determination as to whether a particular call should be recorded is made at the voice recorder application 224 based on the identifier associated with a particular inmate as will be discussed in greater detail herein below.

In some embodiments of the present invention, the voice processing apparatus 226 can block all DTMF tones on the controlled lines in a manner well known in the art. For example, an off-the-shelf Interactive Voice Response (IVR) system that listens in and detects DTMF tones can be used. In these embodiments, the "DTMF tone block" tag is used to identify numbers to which DTMF tone blocking is not to be applied. These are generally numbers associated with government organizations utilizing IVR systems. In other embodiments, the voice processing apparatus 226 can be provisioned not to block DTMF tones on the controlled lines and in these embodiments the "DTMF tone block" tag is used to identify numbers to which DTMF tone blocking is to be applied.

With continued reference to FIG. 4, a user profile 400 for an inmate having a smart card with a smart card identifier "555/555" is depicted. The user profile 400 contains a file "555_555.dat" containing data for additional identification of the inmate representing a retina scan, iris scan, fingerprint information, hand print information, information derived from a keystroke pattern analysis, a personal identification number, a voice print or the like. The inmate "555/555" has three numbers on his allowed call list and it is assumed that a Court order has been issued for recording outbound calls made by the inmate "555/555". The first number on the list of allowed numbers 404 is 111-222-3333, which for example, can be the telephone number of the inmate's lawyer. The "voice record OFF" tag is set at "YES" indicating that the calls to this number should not be recorded. At the same time, the "DTMF tone block" tag has been set to "YES" indicating that DTMF tones are not allowed on the calls to this number and should be blocked. This is done in part to prevent the inmate from establishing a three-way call to circumvent the list of allowed numbers 404 contained in the user profile 400. The second number on the list of allowed numbers 404 is 222-333-4444, which for example, can be a number of a government organization. The "voice record OFF" tag has been set to "NO" indicating that the conversation to this number should be recorded as per the Court order and the "DTMF tone block" tag has been set to "NO" indicating that DTMF tones should be allowed on the calls to this destination number. The third number on the list of allowed numbers 404 is 333-444-5555, which for example, can be a number of an inmate's relative. The "voice record OFF" tag has been set to "NO" indicating that the conversation to this number should be recorded as per the Court order and the "DTMF tone block" tag has been set to "YES" indicating that DTMF tones should not be allowed on the calls to this destination number. One will appreciate, that the number of telephone numbers listed on the list of allowed numbers 404 will depend on the policies in force in a particular facility 102. It should be further understood, that any combination of these two or other associated parameters 406 can be used in the user profile 400.

In some embodiments of the present invention, the user profile 400 can further comprise an audio file containing the recorded name associated with the inmate (not shown) that has been recorded either by the inmate himself or herself or has been recorded by the system 100 administrator. In cases where the name has been recorded or re-recorded by the inmate, the system 100 administrator can access the recorded or re-recorded name to determine whether it contains the correct information (i.e. the correctly recorded name) or whether it has been recorded in accordance with various policies and regulations. In case that id does not correspond to the policies and regulations the system 100 administrator may delete and/or re-record the name. In other embodiments of the present invention, the user profile 400 can contain a text string representing the name of the inmate. In these embodiments, the voice processing apparatus 226 comprises text to speech functionality well known in the art to convert the text string to voice as will be described in greater detail below. As will be explained in greater detail herein below, the recorded or synthesized name can be used to announce the caller when connecting the call to the destination party.

Figure 2B:
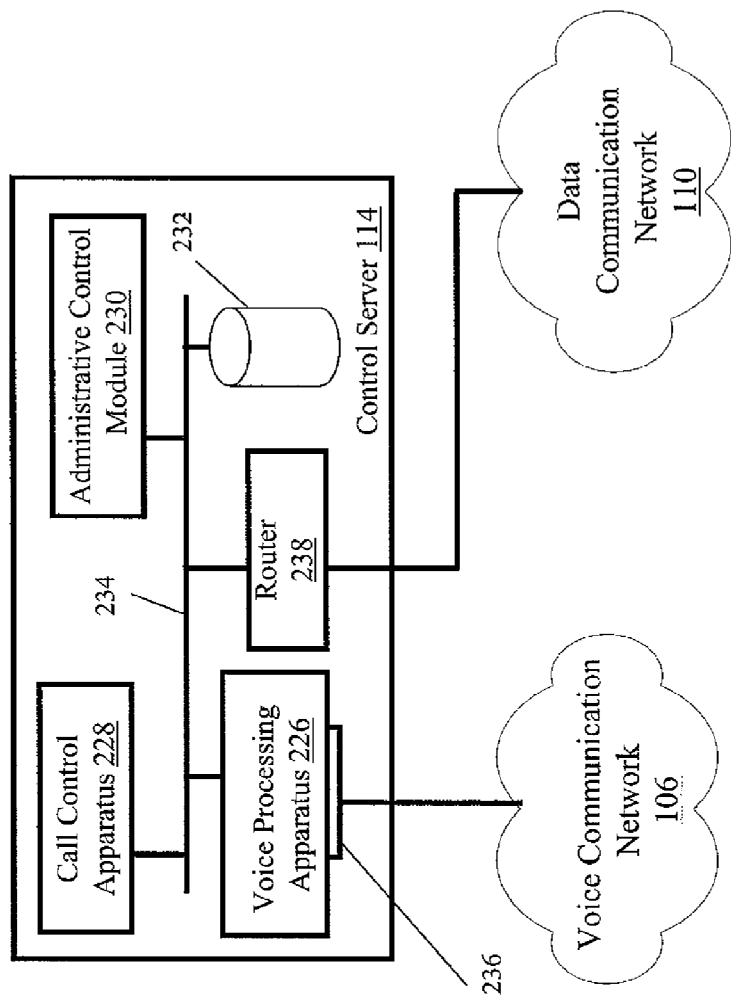
FIG. 2B is a block diagram illustrating further elements of the system for controlling an outbound call according to one embodiment of the present invention.

With continued reference to FIG. 2B, the administrative control module 230 allows administrators of the system 100 to provision various parameters of the system 100. As will be appreciated by one skilled in the art, the administrative control module 230 comprises an interface (now shown) to allow administrators to access the administrative control module 230 either locally or via the LAN 234 and the data network 110. Administrative tasks that can be performed by administrators using the administrative control module 230 can include but are not limited to: make changes and create new entries in the network identifiers table 300, create new user profiles 400, make modifications to the existing user profiles 400 (including but not limited to: amending the list of allowed numbers 404, amending or adding associated parameters 406 or the like), establish maximum call durations, run reports for billing and other purposes, create user specific reports and the like. Other administrative features will be apparent to those of skill in the art having regard to the teachings of the present invention.

Figure 5A:
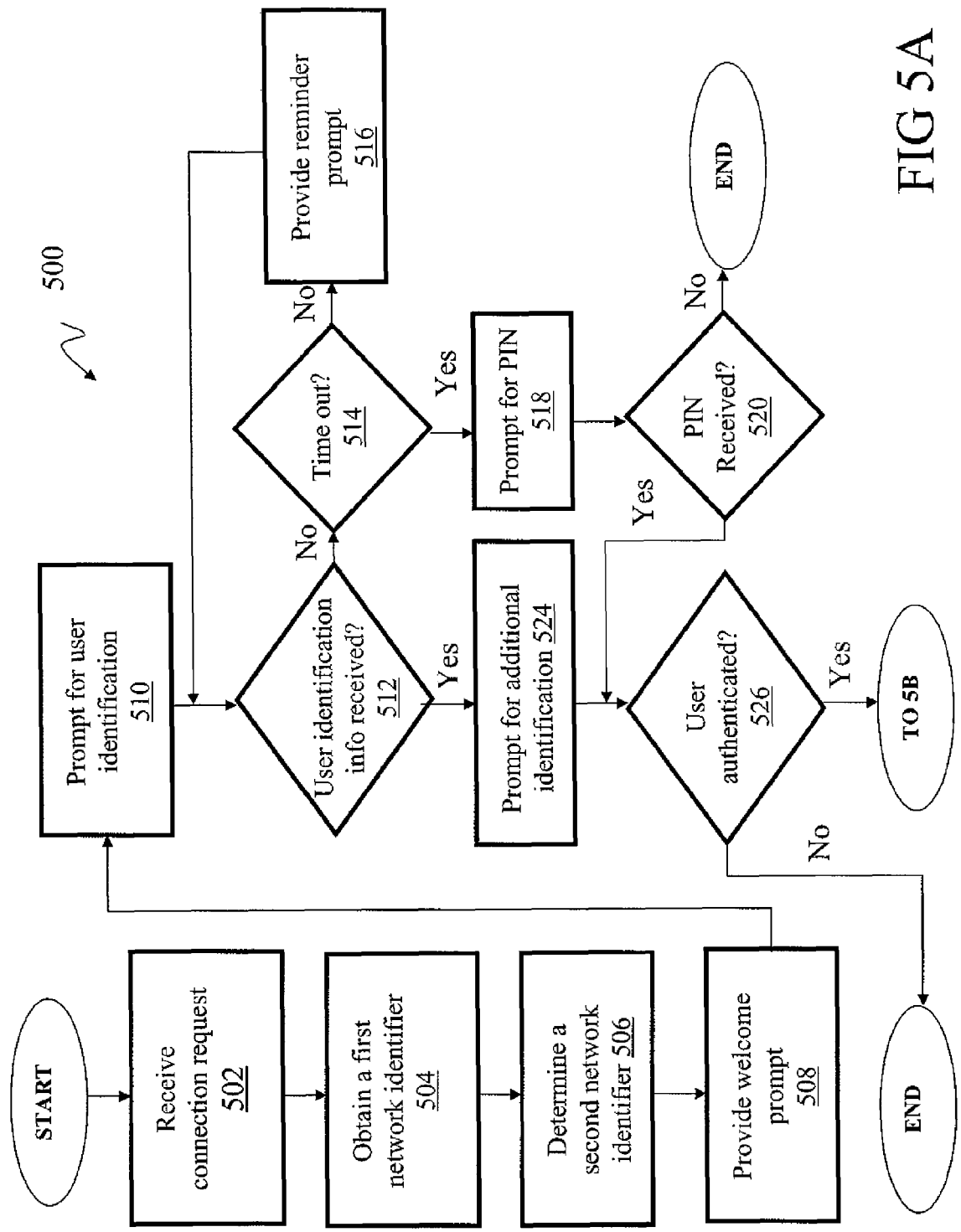
FIGS. 5A, 5B and 5C are flow charts of a method for controlling an outbound call according to one embodiment of the present invention.
Figure 5B:
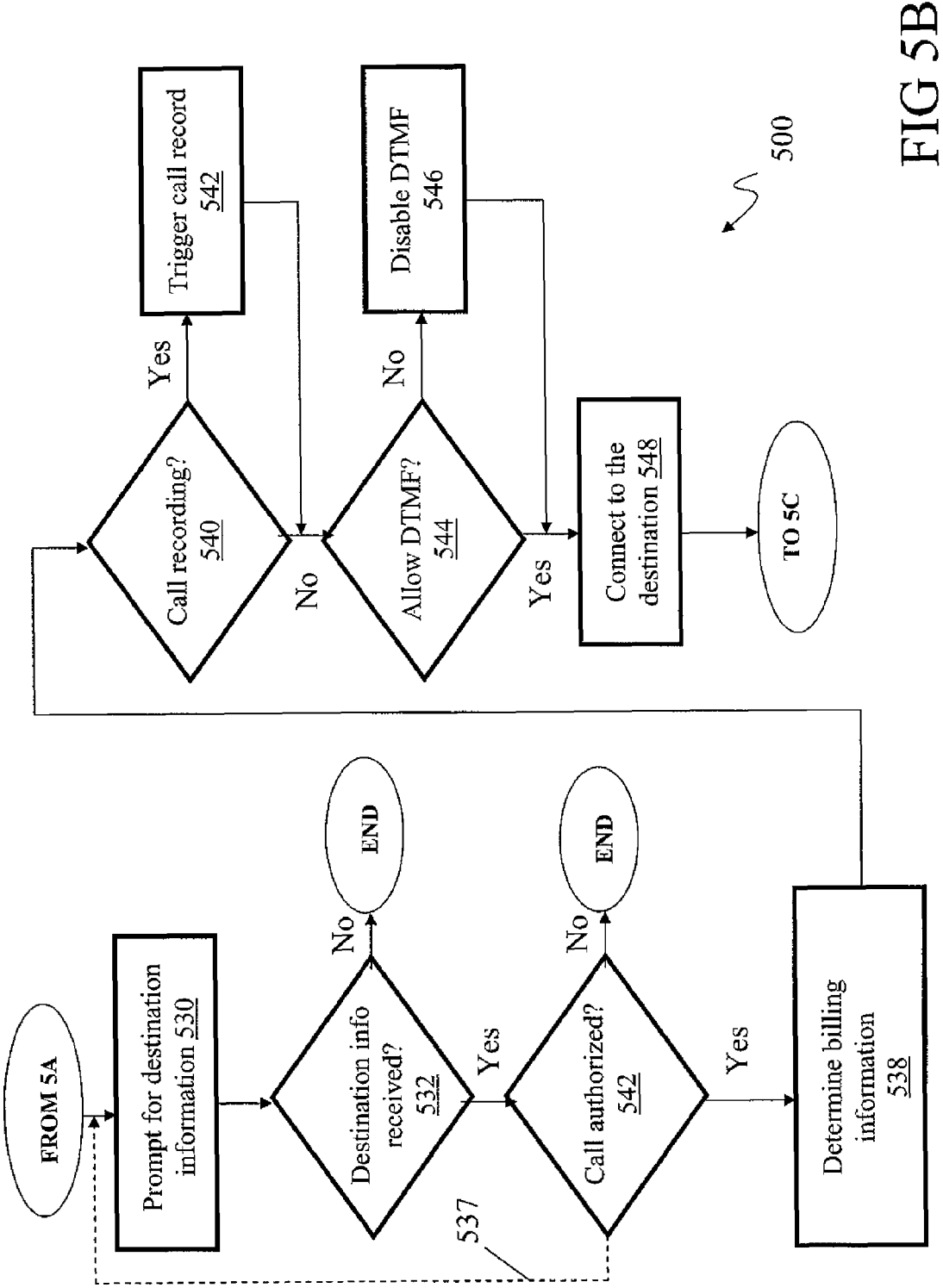
Figure 5C:
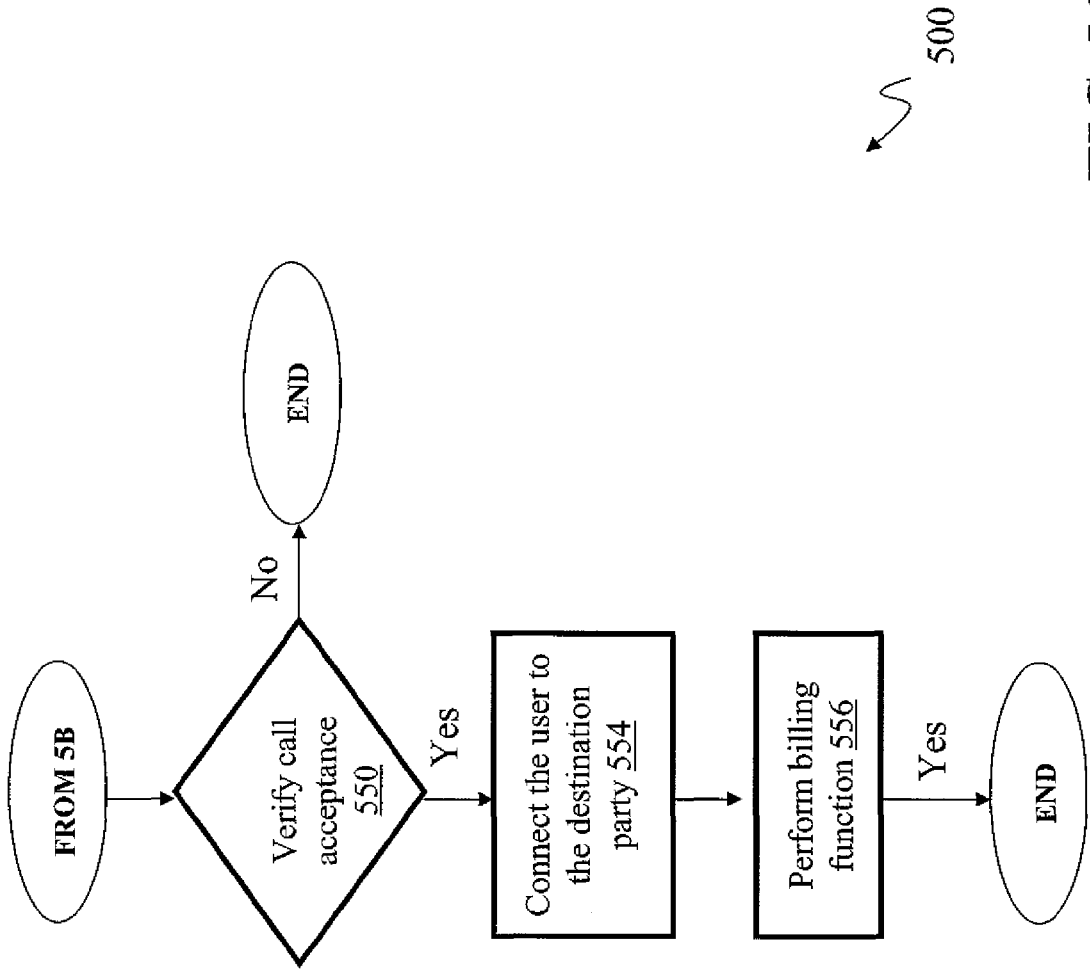

A method 500 for controlling an outbound call will now be described with reference to FIGS. 5A-5C. In order to assist in the explanation of the method, it will be assumed that method 500 is operated using the control server 114 within the system 100 of FIG. 1. Furthermore, the following discussion of method 500 will lead to further understanding of system 100 and its various components. It should be understood that the steps in method 500 need not be performed in the sequence shown. Further, it is to be understood that system 100 and/or method 500 can be varied, and need not work as discussed herein in conjunction with each other, and that such variations are within the scope of the present invention.

As an example only and not as a limitation, method 500 will be described using an example of a correctional facility. It should be understood, that method 500 is equally applicable in other facilities where control of outbound calling is desired.

In step 502 (FIG. 5A) the voice processing apparatus 226 receives a connection request. When an inmate wishes to place an outbound call, he/she approaches the communication device 104 and lifts the receiver. The communication device 104 establishes a first connection with the voice processing apparatus 226 via the voice network interface 208 and the voice communication network 106. In some embodiments, the communication device 104 is provided with an auto-dial button (not shown) which when pressed establishes communication with the voice processing apparatus 226 via the voice communication network 106. In other embodiments, one of the existing buttons (such as a button typically marked with a "◊" symbol and typically used for re-dialling) can be used. In some embodiments of the present invention, only the auto-dial button is activated and all the remaining buttons of the communication device 104 are de-activated. In this manner, the communication device 104 can be used only to establish an outbound call to the voice processing apparatus 226. It should be understood that the first connection can also be established in a conventional manner, i.e. by means of the user dialling the number using a keypad of the communication device 104.

The auto-dial button can be pre-programmed with the network identifier associated with the voice processing apparatus 226. In some embodiments, the network identifier can be a telephone number. In one specific non-limiting example, the telephone number is a toll-free number, such as 1-800-555-6666. In some embodiments of the present invention, all communication devices 104 located within the same facility 102 can use the same telephone number associated with the voice processing apparatus 226. In other embodiments, all communication devices 104 in all controlled facilities 102 can use the same telephone number associated with the voice processing apparatus 226. One skilled in the art will appreciate that voice processing apparatus 226 can handle multiple incoming calls at the same time in a manner well known in the art. It should be noted that if the control server 114 is used for provisioning of other services, the control server 114 can use the number dialled by the communication device 104 to establish the communication to determine that the system and the method according to the present invention is to be used. One skilled in the art will appreciate that there is a benefit in using a toll-free number, as routing information can be changed at the network level without the need to pre-program the plurality of communication devices 104. However, any other identifier compatible with the voice communication network 106 can be used.

In step 504, the voice processing apparatus 226 obtains a network identifier associated with the communication device 104. In some embodiments of the present invention, the network identifier associated with the communication device 104 is the telephone number associated with the communication device 104 captured using the Caller Line ID (CLID) information. The voice processing apparatus 226 obtains the CLID of the communication device 102 in a manner well known in the art.

In step 506 the call control apparatus 228 determines a second network identifier based on the first network identifier obtained in step 504. In some embodiments of the present invention, the second network identifier is an IP address associated with the verification unit 218 that can be used for communicating with the verification unit 218 via the data communication network 110. The voice processing apparatus 226 transmits the first network identifier obtained in step 504 to the call control apparatus 228. The call control apparatus 228 accesses the network identifiers table 300 of the profile database 232 and determines the second network identifier that corresponds to the first network identifier. For example, if the first network identifier received in step 504 comprises a telephone number 555-666-7788, the call control apparatus 228 determines that the corresponding second network identifier associated with the verification unit 218 is an IP address 65.24.17.123.

In some embodiments of the present invention, in step 508 the voice processing apparatus 226 provides a welcome prompt to the inmate. In these embodiments, the call control apparatus 228 instructs the voice processing apparatus 236 to play a welcome prompt to the user. One skilled in the art will appreciate that a file containing the welcome prompt is pre-provisioned by the administrators of system 100 and is stored at the call control apparatus 228 or another component of the control server 114. In one specific non-limiting example, the welcome message played to the user can comprise "Welcome to the call processing and communication service". One should understand that the prompt can be delivered in any other way known in the art. It should be further understood that any other message can be played or the step 508 can be omitted altogether.

In step 510, the call control apparatus 226 prompts the inmate to provide user identification 402. It will be recalled, that in some embodiments, the user identification 402 can be a smart card number associated with the smart card issued to the inmate. The call control apparatus 228 instructs the voice processing apparatus 226 to provide a voice prompt to the user to insert his/her smart card into the verification unit 218 to the extent of "Please insert your smart card into the smart card reader" or any other suitable prompt. In other embodiments, the prompt can be sent in textual form by the call control apparatus 228 to the processing unit 202 via the data communication network 110 for displaying to the inmate using the input/output interface 204 (such as the display) of the communication device 104. In yet further embodiments of the present invention, the call control apparatus 228 can send instructions to the processing unit 202 via the data communication network 110. Upon receipt of such instructions, the processing unit 202 provides the prompt to the user, such as a voice prompt or a visual prompt using the input/output interface 204. It should be understood that in some embodiments of the present invention, the user identification 402 can be obtained from a fingerprint scan, a hand print scan, a retina scan, an iris scan and information representing key stroke pattern, as well as a Personal Identification Number and a voice pattern. It should be emphasised that any combination of the above can be used for obtaining user identification 402.

It should be further appreciated that the user identification can be performed on "one-to-one" or "one-to-many" basis. To illustrate, consider a scenario wherein the user identification 402 is being derived from an iris scan. The call control apparatus 226 may invite the inmate to provide an iris scan using the verification unit 218. When the iris scan is obtained, it can be compared with all the stored iris scans (which can be stored at the verification unit 218, the processing unit 202 or the profile database 232) to determine who the iris scan belongs to (i.e. to identify the inmate associated with the provided iris scan). This comparison process is commonly referred to as "one-to-many".

On the other hand, consider a scenario with the user identification 402 being derived from a smart card number. When the smart card number is obtained, it can be used to retrieve a particular one of user profiles 400 associated with specific user identification 402 and the retrieved user profile 400 can be used as basis for user verification and/or retrieving call parameters that the particular user is entitled to. This comparison process is commonly referred to as "one-to-one".

In step 512, the call control apparatus 228 checks if the user identification 402 has been received. In a specific non-limiting example, the call control apparatus 228 verifies if the inmate has inserted his or her smart card into the verification unit 218. If the inmate inserts his/her smart card into the verification unit 218, the verification unit 218 reads the card and obtains the information encoded in the card in a manner well known in the art (i.e. using a chip or a magnetic stripe). The verification unit 218 then extracts the user identification 402 and transmits the user identification 402 to the call control apparatus 228 via the data communication network 110 and the LAN 234. A person skilled in the art will appreciate, that such user identification 402 would need to be packetized into at least one packet and such at least one packet would further contain all the information required for routing such a packet to the call control apparatus 228.

If the outcome of step 512 is negative (i.e. if the inmate has failed to insert his/her smart card into the verification unit 218 and, as such, the call control apparatus 228 has failed to receive the user identification 402), in step 514 the call control apparatus 228 determines if a pre-determined wait time has been exceeded. In one specific non-limiting example, the pre-determined wait time can be 10 seconds. One skilled in the art will appreciate that any other amount of time could be specified. If the wait time has not been exceeded, the call control apparatus 228 provides a prompt in step 516 reminding the inmate to insert his/her smart card into the verification unit 218. The prompt provided in step 516 can be substantially similar to that provided in step 510. Any other suitable prompt could be provided in step 516 or no reminder prompt may be provided. Once the reminder prompt has been provided in step 516, the call control apparatus 228 returns to step 512 and verifies if the user identification 402 has been received.

If the user identification has not been received and the wait time has been exceeded, the call control apparatus 228 can prompt in step 518 the user to provide his/her PIN. The call control apparatus 228 can instruct the voice processing apparatus 226 to provide a voice prompt to the inmate to the extent of "Please key in your Personal Identification Number using the telephone keypad". One should understand that any other prompt delivered in any manner known in the art can be provided. It should be recalled that the voice processing apparatus 226 is operable to detect DTMF tones via the voice communication network 106. As such, the voice processing apparatus 226 is operable to detect the PIN entered by the inmate and relay the PIN to the call control apparatus 228.

In step 520, the call control apparatus 228 verifies if the PIN has been received. If the outcome of step 520 is negative (i.e. the inmate has failed to input his/her PIN), the call control apparatus 228 ends the call. The call control apparatus 228 terminates connection with the verification unit 218 and instructs the voice processing apparatus 226 to terminate connection with the communication device 104.

On the other hand, if the outcome of step 512 has been positive (i.e. the user identification 402 has been received) or if the outcome of step 520 has been positive (i.e. the call control apparatus 228 has received the user PIN), the call control apparatus 228 can prompt the inmate for additional identification information as depicted in step 524. In some embodiments of the present invention, the additional identification information can be a biometric identifier, such as a fingerprint scan, a retina scan and/or an iris scan. In further embodiments, the additional identification information can be a PIN number assigned to the inmate. It should be appreciated that is the system 100 uses a PIN for step 518, the PIN used as additional identification information can be a different PIN from that used in step 518. The call control apparatus 228 can instruct the voice processing apparatus 226 to provide a voice prompt to the inmate to the extent of "Please provide a fingerprint scan using the fingerprint scanner" or "Please provide an iris scan using the iris scanner". One should understand that any other prompt delivered in any manner known in the art can be provided. In yet further embodiments of the present invention, the additional identification information can be a voice print captured by the voice processing apparatus 226. One should further understand that any combination of additional identification information can be used.

In some embodiments of the present invention, additional identification information transmitted in step 512 can be considered to be additional user information, such as user authentication information. For illustration purposes and not as a limitation, the following example is provided. In step 512 a user identifier in the form of a smart card number has been received (as described above, this user identifier is used to identify the inmate and to retrieve his or her user profile). Therefore, the additional information received in step 512 (such as fingerprint scan, retina scan, iris scan, voiceprint, PIN and the like) can be used as additional user authentication information for additional security, if desired. Any number and any combination of identification and/or verification means can be combined to ensure the required level of security.

It should be understood that the user authentication step (i.e. steps 524 and 526) are optional steps and can be omitted in certain embodiments of the present invention. As such, presence or absence of these steps should not be construed as a limiting feature of the present invention. Furthermore, the time out step 514 and the PIN steps 518 and 520 are also optional and can be omitted in certain embodiments of the present invention.

In step 526, the call control apparatus 228 authenticates the inmate. In particular, the call control apparatus 228 verifies if the additional identification information entered by the inmate in step 524 corresponds to that on file. It will be recalled that the user profile 400 comprises a file comprising additional identification information (file 555_555.dat depicted in FIG. 4). In one specific non-limiting example, the call control apparatus 226 accesses the user profile 400 stored on the profile database 232 based on the user identification 402 received in step 512 and checks if the additional identification information (i.e. fingerprint scan, retina scan, iris scan, voice print, PIN or any other additional identification information requested by the call control apparatus 228 in step 524) corresponds to that contained in the user profile 400. If the comparison made in step 526 renders a negative outcome (i.e. the inmate has provided the additional identification information that does not correspond to that contained in the user profile 400), the call control apparatus 228 ends the call. The call control apparatus 228 terminates connection with the verification unit 218 and instructs the voice processing apparatus 226 to terminate connection with the communication device 104.

However, if the comparison made in step 526 renders a positive outcome (i.e. the inmate has provided the additional identification information that corresponds to that contained in the user profile 400), the call control apparatus 228 prompts in step 530 (FIG. 5B) for destination information. The call control apparatus 228 can instruct the voice processing apparatus 226 to provide a voice prompt to the inmate to the extent of "Please key in the telephone number you wish to dial". One should understand that any other prompt delivered in any manner known in the art can be provided. In some embodiments of the present invention, the destination information can be a telephone number the inmate wishes to dial.

In step 532, the call control apparatus 228 checks if the destination information has been received. In one specific non-limiting example, the call control apparatus 228 checks if the inmate has keyed in the destination number. As will be appreciated by those of skill in the art, the communication device 104 generates DTMF tones representing the numbers that the inmate has keyed in and the DTMF tones are transmitted to the voice processing apparatus 226 via the connection established over the voice communication network 106. It will be recalled that the voice processing apparatus 226 is operable to detect DTMF tones via the voice communication network 106. As such, the voice processing apparatus 226 is operable to detect the DTMF tones generated by the communication device 104 pursuant to the inmate entering the destination telephone number. The voice processing apparatus 226 transmits the extracted information to the call control apparatus 228 via LAN 234.

If the determination made in step 532 has rendered a negative result (i.e. the inmate has not keyed in the destination information), the call control apparatus 228 ends the call. The call control apparatus 228 terminates connection with the verification unit 218 and instructs the voice processing apparatus 226 to terminate connection with the communication device 104. It should be understood that the call control apparatus 228 can end the call after a pre-determined period of time allowed for the inmate to key in the destination information (such as 30 seconds, 60 seconds or any other appropriate delay).

However, if the determination made in step 532 has rendered a positive result (i.e. the inmate has keyed in the destination information), the call control apparatus 228 checks in step 536 if the outbound call is an authorized call. In some embodiments of the present invention, the call control apparatus 228 accesses profile database 232 to retrieve the user profile 400 associated with the inmate. In one specific non-limiting example, the call control apparatus 228 retrieves the user profile 400 based on user identification 402 received in step 512. Once the user profile 400 is retrieved, the call control apparatus 228 verifies if the outgoing call is an authorized call. In one embodiment of the present invention, the call control apparatus 228 verifies that the telephone number dialled by the inmate (i.e. the destination information received in step 532) is listed in the list of allowed numbers 404.

If in step 536 the call control apparatus 228 failed to authorize the call (for example, if the telephone number dialled by the inmate is not listed in the list of allowed numbers 404), the call control apparatus 228 can end the call. The call control apparatus 228 can instruct the voice processing apparatus 226 to play a prompt to the user to the extent of "The call to the dialled destination is not authorized". It should be understood that the prompt can be delivered in any other manner known in the art. The call control apparatus 228 terminates connection with the verification unit 218 and instructs the voice processing apparatus 226 to terminate connection with the communication device 104. It should be understood that in some embodiments of the present invention, the call control apparatus 228 can return to step 530 and prompt for alternative destination information, as depicted by a broken line 537.

If, however, in step 536 the call control apparatus has been successful in authorizing the call (for example, if the telephone number dialled by the inmate is listed in the list of allowed numbers 404), the call control apparatus 228 determines in step 538 billing information. In one embodiment of the present invention, the call control apparatus 228 determines if the call to the destination number should be treated as local, long distance or overseas. In one specific non-limiting example, the call control apparatus 228 determines the call treatment based on the telephone number associated with the communication device 104 irrespective of the actual physical location of the control server 114. The call control apparatus 228 can further check the available purse balance for the inmate. In one specific non-limiting example, the call control apparatus 228 instructs the verification unit 218 to obtain the purse balance stored on the smart card. In other embodiments, the call control apparatus 228 may access a purse balance table (not shown) stored on the profile database 232 and retrieve the purse balance based on the user identification 402 received in step 512. If the retrieved purse balance is zero (i.e. if the inmate has used his/her credits or has insufficient funds to initiate the call to the requested destination) the call control apparatus 228 ends the call. In some embodiments of the present invention, the call control apparatus 228 instructs the voice processing apparatus 226 to provide a prompt to the inmate to the extent of "This call can not be completed due to insufficient funds. Please replenish your smart card and try again later". One should understand that any other prompt can be delivered in any other manner. The call control apparatus 228 can also initiate the timer (not shown) in order to measure the length of the call for billing purposes.

Once the billing information is determined in step 538, the call control apparatus 228 verifies in step 540 if the call should be recorded. In some embodiments of the present invention, the call control apparatus 228 retrieves the "voice recorder OFF" tag from the user profile 400 and based on the content of the "voice reader OFF" tag sends instructions to the voice recorder apparatus 224. It should be understood that in other embodiments of the present invention, the call control apparatus 228 can determine whether a particular call should be recorded on the basis of the user identification 402, the destination information or a combination of these and other parameters. If in step 540 it is determined that the call should be recorded, the call control apparatus 228 sends instructions to the voice recorder apparatus 224 via the data communication network 110 to start recording as depicted in step 542. In these embodiments, the call control apparatus 228 also transmits to the voice recorder apparatus 224 an identifier associated with the communication device 104 (such as a telephone number of the communication device 104 determined, for example, from the Caller Line ID; an IP address of the communication device 104 retrieved, for example, from a header of an IP packet used for establishing a connection between the communication device 104 and the call control apparatus 228; or the like). The identifier associated with the communication device 104 enables the voice recorder apparatus 224 to identify which voice session (i.e. the voice session originating from the communication device 104) to record.

It should be understood that in some embodiments of the present invention, the voice recorder apparatus 224 can maintain its own database of user identification 402 and associated destination numbers whose calls should be recorded. In these embodiments, the associated parameter 406 of the user profile 400 does not contain the "voice recorder OFF" tag. In these embodiments, the call control apparatus 228 transmits the user identification 402, the first network identifier associated with the communication device 104, and the destination information to the voice recorder apparatus 224 so that the voice recorder apparatus 224 can determine whether the call should be recorded or not. The call control apparatus 228 can transmit this information via the data communication network 110. One will appreciate that in these embodiments, the call control apparatus 228 is aware of the identifier associated with the voice recorder apparatus 224, such as an IP address or the like.

The voice recorder apparatus 224 can maintain a database (which can be substantially similar to the profile database 232) containing data that would enable to voice recorder apparatus 224 to determine whether a particular outbound call is to be recorded. Exemplary type of data maintained by the voice recorder apparatus 224 can include, but is not limited to:
- a list of inmate identities whose calls to particular destinations should be recorded;
- a list of inmate identifiers whose calls to any destination should be recorded;
- a list of destination numbers to which calls should be recorded.

As such, the voice recorder apparatus 224 can be operable to determine whether to record a particular outbound call based on at least one of the user identification 402, the destination number or a combination thereof. The voice recorder apparatus 224 can be further operable to initiate recording of a particular call established from a particular communication device 104, as determined based on the first network identifier.

It should be noted that in some embodiments of the present invention, the call control apparatus 228 can translate the user identification 402 into a so called "indication of the user identifier". This can be advantageous in a scenario where, for example, the user identification 402 comprises a biometric identifier (for example, a fingerprint). In this scenario, the call control apparatus 402 can be operable to perform a look up to determine a numeric or alpha-numeric indication that is representative of the particular user identification 402. In another embodiment, in which this can be advantageous, the user identification 402 comprises a first identifier (for example, a name) and the "indication of the user identifier" could be a second identifier (for example, a user number and the like), looked up on the basis of the first identifier. In a similar manner, the call control apparatus 402 can translate the destination number into a so-called "indication of the destination identifier". In one specific non-limiting example the call control apparatus 402 can translate a particular destination number 416.222.1567 into the indication of the destination identifier which can be "1C".

It should be clear to one skilled in the art that in these embodiments there is no need to maintain "voice recorder OFF" tag in the associated parameters 406. It should be further understood that in these embodiments, steps 540 and 542 are omitted and are substituted by the step of transmitting the user identification 402 as described above.

In step 544 the call control apparatus 228 verifies if DTMF blocking should be disabled by retrieving associated parameters 406. In one example, the call control apparatus 228 can retrieve the "DTMF tone block" tag. If the determination in step 544 has rendered a positive result, i.e. that the conversation should be recorded (for instance, if the "DTMF tone block" tag contains a "YES"), the call control apparatus 228 sends instructions to the voice processing apparatus 226 to block DTMF tones as depicted in step 546.

In step 548, the call control apparatus 228 connects to the destination party. In one specific non-limiting example, the call control apparatus 228 instructs the voice processing apparatus 226 to put the call with the communication device 104 on hold and to establish a second call based on the destination information received in step 532. It will be appreciated that the voice communication network 106 comprises all the required elements to switch the call to the destination, such as toll switches (such as DMS200), Signal Transfer Points and other elements well known in the art and not shown in FIG. 1 for the sake of simplicity. One skilled in the art will appreciate, that if the server 100 is to enable collect calls, the voice communication network 106 will further comprise an Automatic Billing and Screening System well known to those skilled in the art. It should be noted that if the voice communication network 106 comprises a packet-based network (such as an Internet Protocol (IP) based network and the like, the voice communication network 106 can further comprise other additional components, such as soft switches, routers, gateway and the like; all of these components well known to those of skill in the art.

In some embodiments of the present invention, in step 550 the call control apparatus 228 verifies call acceptance with the destination party. In one specific non-limiting example, once the destination party answers the call, the call control apparatus 228 instructs the voice processing apparatus 226 to provide a prompt to the destination to the extent of "You have an incoming call from John Doe. Please select 1 to accept the call or select 2 to reject the call". It will be recalled that the user profile 400 can comprise an audio file containing the inmate name or a text string that can be converted to voice using text to speech capabilities of the voice processing apparatus 226. In either case, the call control apparatus 228 retrieves the required information from the user profile 400 and transmits the information to the voice processing apparatus 226 which in turn uses the information to properly customize the announcements. At this stage, the destination party can accept or reject the call for example, by using DTMF tones in a manner well known in the art.

If at step 550 it is determined that the destination party rejects the call, the call control apparatus 228 ends the call. The call control apparatus 228 instructs the voice processing apparatus 226 to provide the inmate with a prompt to the extent of "Unfortunately, the call could not be connected due to technical difficulties. Please try again later". One should understand that any other prompt can be provided in this or in any other manner. At this stage, the call control apparatus 228 disconnects the connection with the verification unit 218 and the voice processing apparatus 226 disconnects the connection with the communication device 104.

However, if in step 550 it has been determined that the call is accepted or if the step 550 has been omitted and the destination party takes their phone off hook in step 548, in step 554, the call with the communication device 104 is connected with the call to the destination party. In some embodiments of the present invention, the call control apparatus 228 performs a three-way call well known to those of skill in the art. Other alternatives will be described herein below.

In step 556 the call control apparatus 228 performs billing function. It should be recalled that in step 538, the call control apparatus 228 initiated the timer to determine the length of the call. Once the call is completed, the call control apparatus 228 determines the length of the call and applies the charges to the inmate account based on the call treatment selected in step 538 (for example: local call, long-distance call or overseas call). The call control apparatus 228 calculates the total cost of the call based on the call duration, call treatment information, call rates and any other additional applicable charges (such as operator charges, toll call charges or the like). The call control apparatus 228 sends a message to the verification device 108 to deduct the appropriate amount from the electronic purse (which can be re-loadable) contained on the smart card. One skilled in the art will appreciate, that in these embodiments of the present invention, the inmate must maintain his/her smart card in the smart card reader throughout the call procedure until the call is completed and the call control apparatus 228 completes the billing function in step 556. Alternatively, the call control apparatus 228 can access the purse balance table (not shown) stored in the profile database 232 and make the appropriate adjustment to the purse balance.

The billing function described in step 556 can be performed continuously from the moment the inmate is connected to the destination in step 554 to the moment the inmate or the destination party hang up the phone (i.e. completes the call), withdraws a smart card from the verification unit 218 or runs out of money (at which point the call will be terminated). That is to say, that the call control apparatus 228 debits the balance stored on the smart card or in the profile databases 232 at regular intervals, such as every second, every minute or any other pre-determined unit of time. One skilled in the art will appreciate that the exact billing arrangement will depend on the policies of the provider of the system 100, as well as the policies of the facility 102. In one specific non limiting example, long distance calls can be billed on minute basis as the start of each minute, wherein local calls can be based on a per call basis at the beginning of each call.

It should be understood that the connection between the call control apparatus 228 and the verification unit 218, as well as connection between the voice processing apparatus 226 and the communication device 104 are maintained throughout the call between the inmate and the destination party. It will be appreciated that maintaining of these connections can be required for billing purposes, for DTMF tone blocking and other functions described herein.

However, it should be understood that this should not be construed as the only possible way to perform method 500. One skilled in the art will understand that in other embodiments, the connection between the call control apparatus 228 and the verification unit 218 does not have to be maintained for the whole duration of the call and may be re-established on demand. Yet further variations apparent to those of skill in the art are clearly within the scope of this invention.

Once the billing function is performed in step 556 (or alternatively, if the user hangs up, if the destination party hangs up, or if the user runs out of available funds), the call control apparatus 228 ends the call. The call control apparatus 228 disconnects the connection with the verification unit 218 and the voice processing apparatus 226 disconnects the connection with the communication device 104. In some embodiments of the present invention, the call control apparatus 228 instructs the voice processing apparatus 226 to provide a prompt to the inmate before disconnecting to the extent of "Thank you for using the service. Have a nice day". It can further provide a prompt confirming the remaining purse balance. It should be understood that any other prompt delivered in any other manner is within the scope of this invention.

Figure 6A:
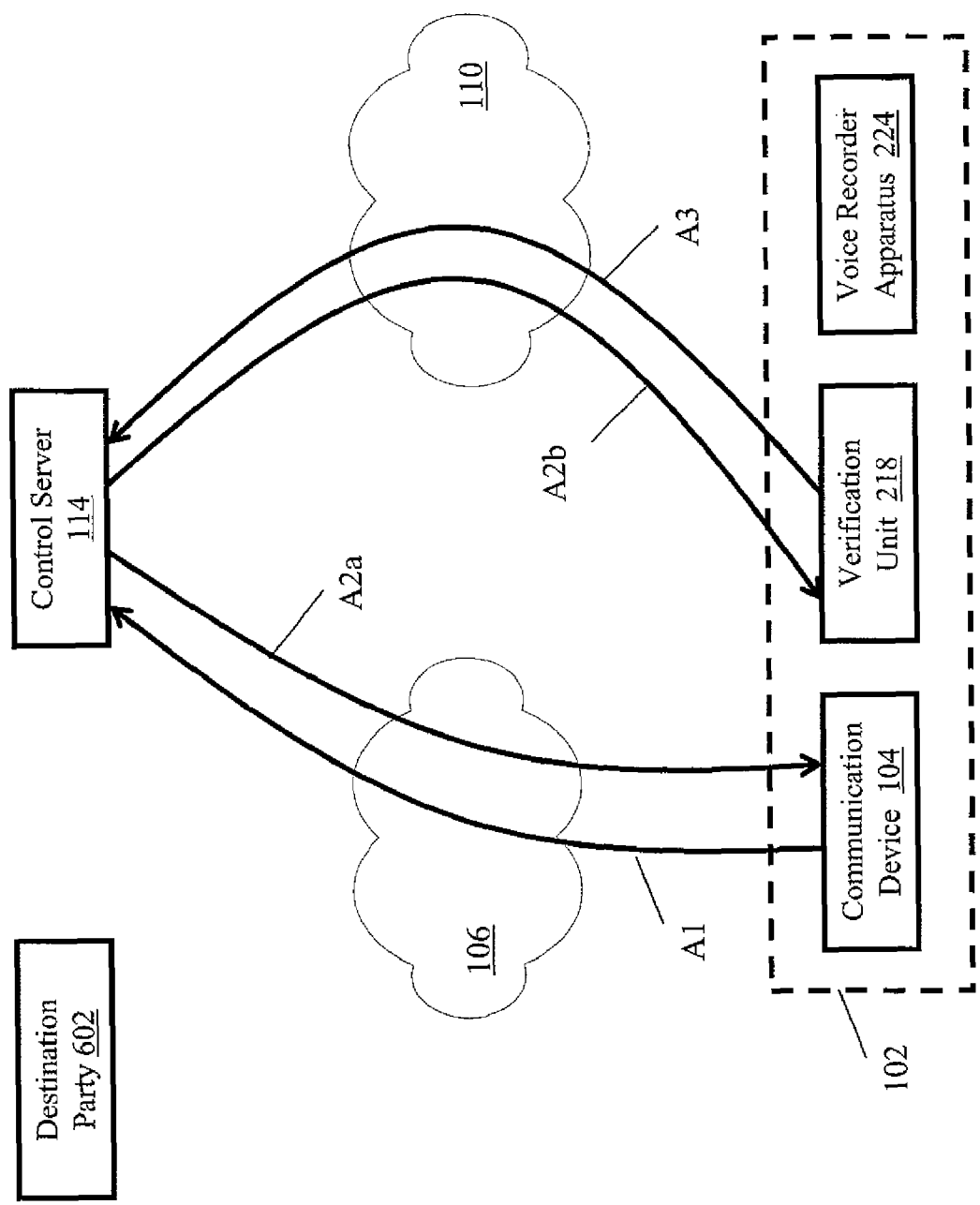
FIG. 6A-6D are logical diagrams representing signal flow between components of the system of FIG. 1 during a call establishing and user identification stage according to various embodiment of the present invention.

With references to FIGS. 6A-6D logical diagrams representing signal flow between components of system 100 during call establishing and user identification stage according to various embodiments of the present invention are depicted. FIGS. 6A-6D comprise logical diagrams comprising the control server 114, the communication device 104, the verification unit 218, the voice recorder apparatus 224, the control server 114, the voice communication network 106 and the data communication network 110. FIGS. 6A-6D further comprise a destination party 602 with whom the user wishes to establish an outbound call. As depicted in FIG. 6A when the user wishes to initiate communication, a signal A1 is transmitted from the communication device 104 to the control server 114 via the voice communication network 106 (for instance, the communication device 104 establishes a communication connection with the control server 114 and the control server 114 detects the telephone number associated with the communication device 104). The control server 114 sends a signal A2a to the communication device 104 prompting the user to provide user identification 402. The control server 114 also determines the network identifier associated with verification unit 218 based on the telephone number associated with the communication device 104. The control server 114 sends a signal A2b to the verification unit 218 based on the obtained network identifier to establish a connection with the verification unit 218 via the data network 110 for receiving user identification 402. In response to the request provided in the signal A2a, the user provides identification information (for instance, inserts his/her smart card into the verification unit 218). The verification unit 218 obtains the user identification 402 (for instance, by reading a smart card inserted into the verification unit 218) and sends the user identification 402 to the control server 114 depicted as signal A3.

As such, the communication device 104 and the verification unit 218 have established connection with the control server 114 via the voice communication network 106 and the data communication network 110; and the control server 114 has obtained the user information corresponding to the user of the communication device 104.

Figure 6B:
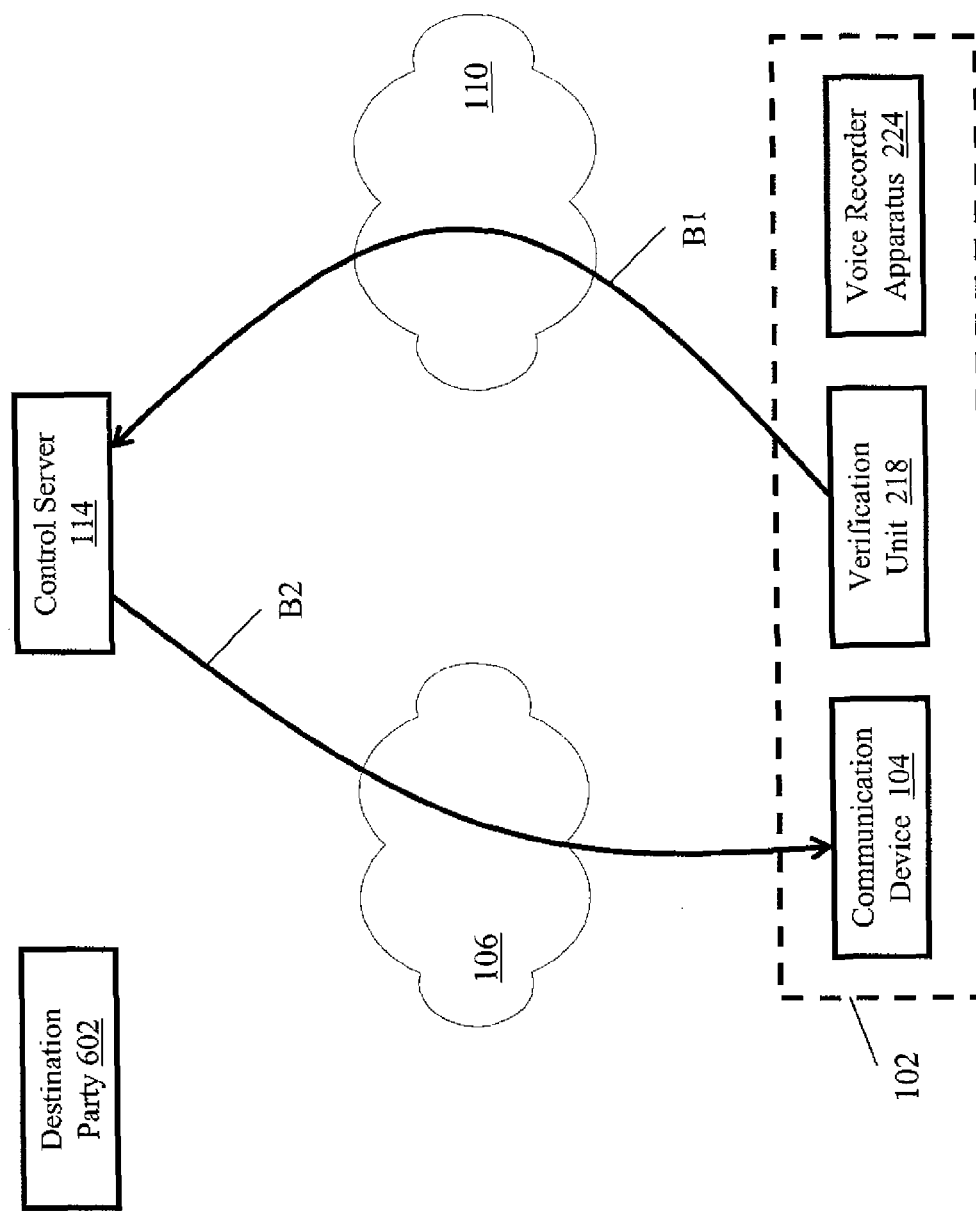

FIG. 6B depicts a logical diagram representing signal flow between components of system 100 during a call establishing and user identification stage according to another embodiment of the present invention. In this embodiment, the call is initiated by a signal B1 from the verification unit 218 to the control server 114. For example, the user may insert his/her smart card into the verification unit 218. Once the smart card is inserted into the verification unit 218, the verification unit 218 establishes a connection with the control server 114 via the data communication network 110. One should understand that in these embodiments, the verification unit 218 is preprogrammed and regularly updated with the network identifier of the control server 114 (for example, an IP address in case of the data communication network 110 being IP-based or any other suitable network identifier). Upon receipt of the signal B1, the control server 114 determines the network identifier associated with the communication device 104 (such as the telephone number) based on the network identifier of the verification unit 218 received along with the signal B1. With reference to FIG. 3, the call control apparatus 228 accesses the network identifiers table 300. For example, if the received first network identifier is 92.1.75.66, the call control apparatus 228 determines that the second network identifier (in these embodiments, the second network identifier is the telephone number associated with the communication device 104) to be 777-888-1122. In these embodiments, the call control apparatus 228 transmits the second network identifier to the voice processing apparatus 226. Once the network identifier of the communication device 104 is determined, the control server establishes a connection with the communication device 104 via the voice communication network 106 depicted as signal B2. One skilled in the art will appreciate that in these embodiments, the communication device 104 is operable to receive incoming calls.

As such, the communication device 104 and the verification unit 218 have established connection with the control server 114 via the voice communication network 106 and the data communication network 110; and the control server 114 has obtained the user information corresponding to the user of the communication device 104.

Figure 6C:
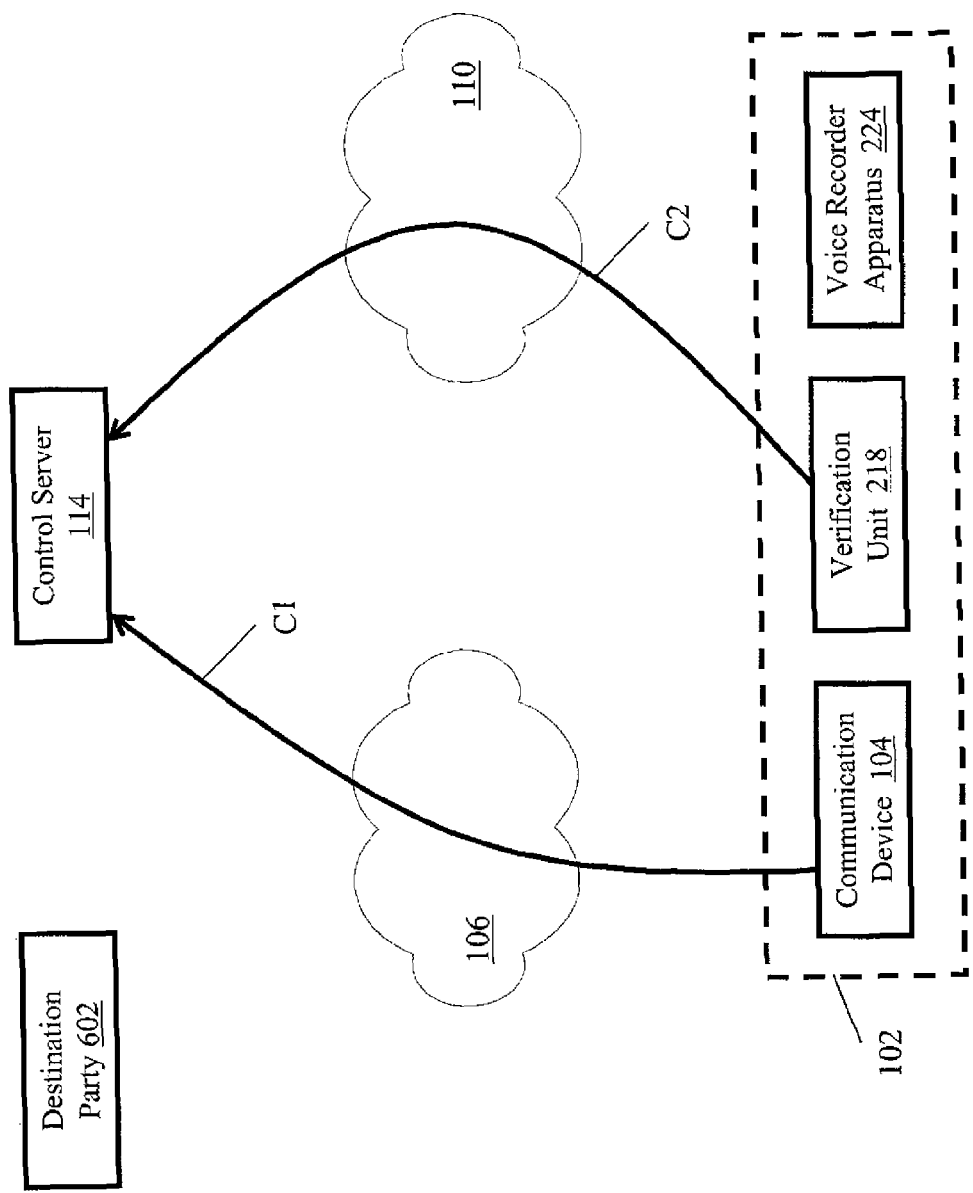

With reference to FIG. 6C a logical diagram representing signal flow between components of system 100 during a call establishing and user identification stage according to yet another embodiment of the present invention is depicted. In this embodiment, the call is initiated by a signal C1 from the communication device 104 to the control server 114 via the voice communication network 106. A first connection (i.e. the connection between the communication device 104 and the control server 114 via the voice communication network 106) is established as depicted by signal C1 and the first network identifier associated with the communication device 104 is obtained. The control server 114 then expects a signal from the verification unit 218. When the user inserts his/her smart card into the verification unit 218, the verification unit 218 generates a signal C2 that is transmitted to the control server 114 with the user identification. The control server 114 detects the second network identifier. The control server 114 then correlates the first and second network identifiers to determine that the communication device 104 and the verification unit 218 are being used by the same user by accessing the network identifiers table 300 (depicted in FIG. 3).

As such, the communication device 104 and the verification unit 218 have established connection with the control server 114 via the voice communication network 106 and the data communication network 110; and the control server 114 has obtained the user information corresponding to the user of the communication device 104.

Figure 6D:
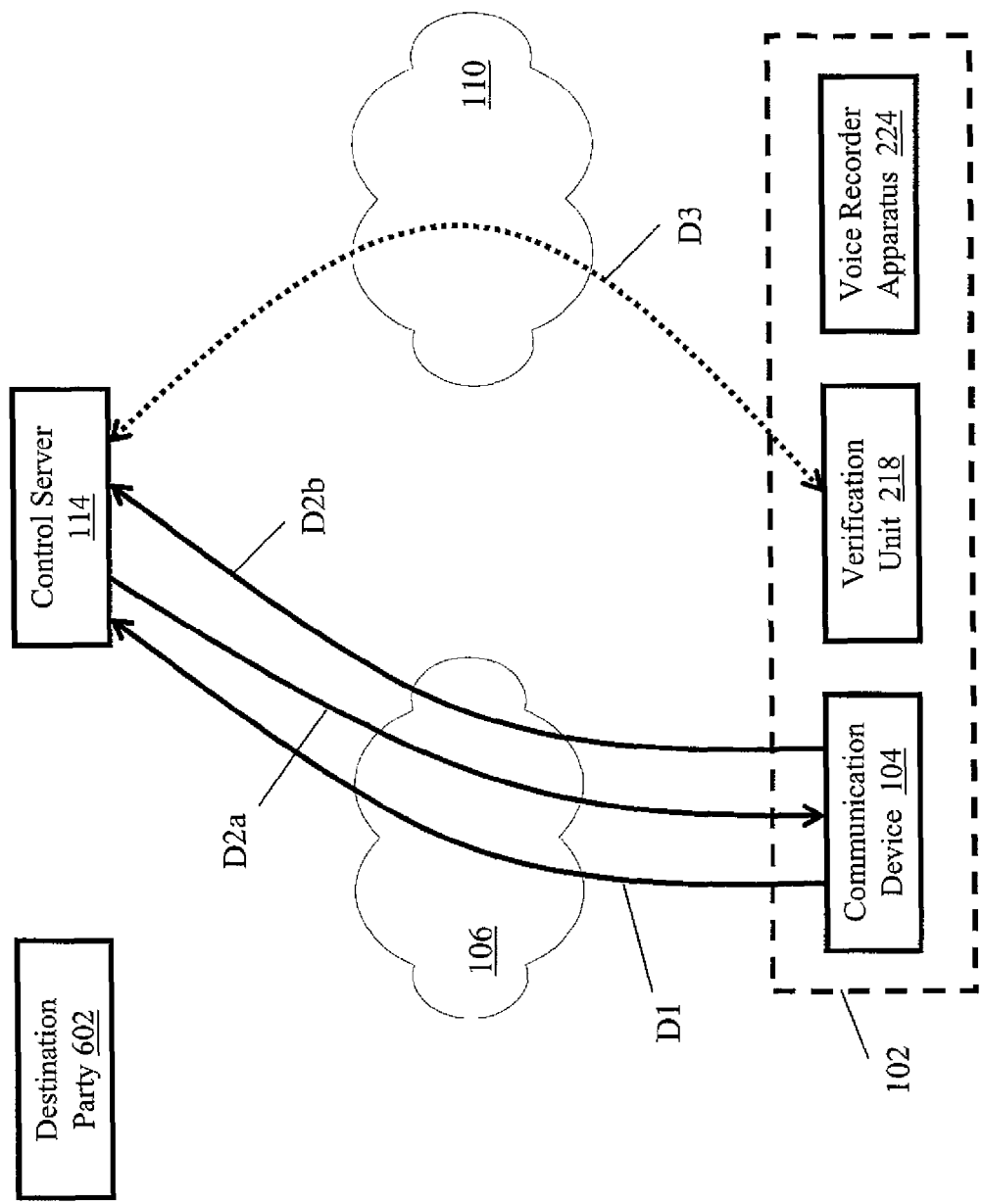

With reference to FIG. 6D a logical diagram representing signal flow between components of system 100 during a call establishing and user identification stage according to yet another embodiment of the present invention is depicted. In this embodiment, the call is initiated by a signal D1 from the communication device 104 to the control server 114 via the voice communication network 106. A first connection (i.e. the connection between the communication device 104 and the control server 114 via the voice communication network 106) is established and the first network identifier associated with the communication device 104 is obtained. The control server 114 generates a signal D2a prompting the user for a PIN. When the user keys in his/her PIN, the communication device 104 generates the signal D2b that is transmitted to the control server 114 with the user PIN. The control server 114 receives a signal D2b from the communication device 104 representing user identification 402 (such as the PIN associated with the user).

The control server 114 also determines the network identifier associated with verification unit 218 based on the telephone number associated with the communication device 104. The control server 114 sends a signal D3 to the verification unit 218 based on the obtained network identifier to establish a connection with the verification unit 218 via the data network 110 for billing purposes. In these embodiments, the signal D3 is used for billing purposes (i.e. to update the purse balance stored on the smart card inserted into the verification unit 218). It should be recalled, that the signal D3 can be continuous and can be maintained throughout the duration of the outbound call (and as such is depicted in dotted line). This billing could also be applicable for signal flows of FIGS. 6A-6C.

As such, the communication device 104 and the verification unit 218 have established connection with the control server 114 via the voice communication network 106 and the data communication network 110; and the control server 114 has obtained user information corresponding to the user of the communication device 104 via the voice communication network 106, wherein the data communication network 110 is used for billing purposes.

Figure 6E:
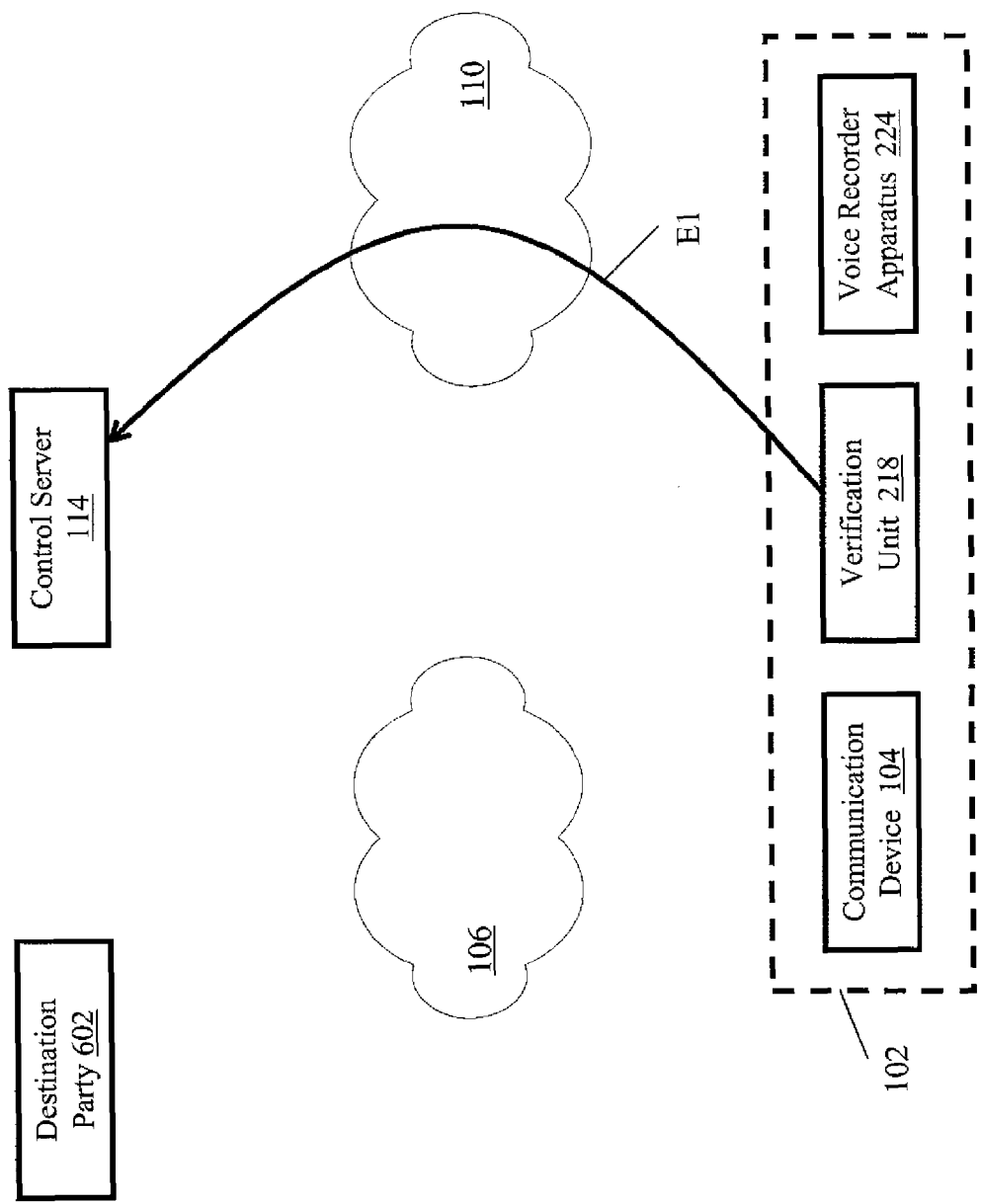
FIGS. 6E and 6F are logical diagrams representing signal flow between components of the system of FIG. 1 during a user authentication stage according to two embodiments of the present invention.

With reference to FIG. 6E a logical diagram representing signal flow between components of system 100 during a user verification stage according to one embodiment of the present invention is depicted. In this embodiment, the user is identified by means of a signal E1 from the verification unit 218 to the control server 114. It should be recalled that the signal E1 may contain information representing the user's fingerprint scan, retina scan, iris scan or any other biometric information. It is noted that the user verification step is optional and as such can be omitted in some embodiments of the present invention.

Figure 6F:
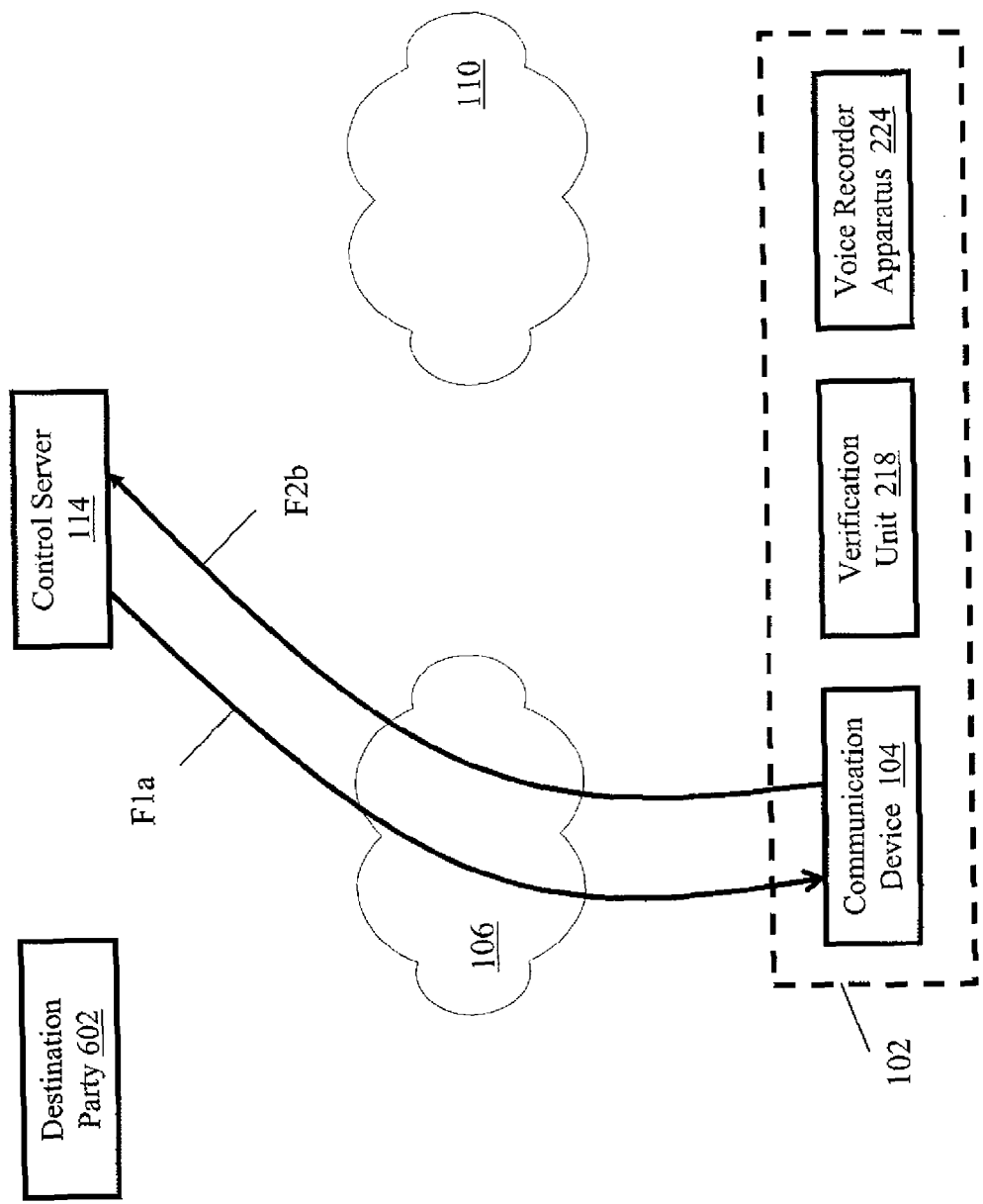

With reference to FIG. 6F a logical diagram representing signal flow between components of system 100 during a user verification stage according to another embodiment of the present invention is depicted. The control server 114 generates a signal F1a prompting the user to provide user identification. In one specific non-limiting example, the signal F1a can comprise a prompt to provide user's PIN. When the user keys in his/her PIN, the communication device 104 generates a signal F1*b* that contains DTMF tones representing PIN associated with the user. In another example, the signal F1*a* can comprise a prompt to provide a voice response in order to generate and authenticate a voice print. In these examples, the signal F1*b* can comprise the user's voice response and user verification may be implemented using speaker verification functionality of the control server 114. It is noted that the user verification step is optional and as such can be omitted in some embodiments of the present invention.

With reference to FIG. 6G a logical diagram representing signal flow between components of system 100 during a call connection stage according to one embodiment of the present invention is depicted. In this embodiment, the connection between the communication device 104 and the control server 114 is established as described previously with reference to FIGS. 6A-6D, depicted in FIG. 6G as a signal G1. The control server 114 establishes a connection with the destination party 602, depicted as signal G2. When the destination party 602 accepts the call, the control server 114 then connects the communication device 104 and the destination party 602, for example by performing a well known three-way call (such as a three-way call or the like) or any other suitable call connection method depicted as a logical signal G3. Effectively, the control server 114 has established a connection between the communication device 104 and the destination party 602 (depicted in dotted line as signal G4), while the control server 114 remains between the communication device 104 and the destination party 602 throughout the call (as depicted by the logical signal G3). In this embodiment, the three-way-call arrangement allows for ongoing monitoring of the call for preventing transmission of DTMF tones, for billing purposes, for collecting statistical information about calls (call durations, etc.) and the like. Furthermore, it should be appreciated that in these embodiments, the control server 114 can control certain parameters of the ongoing call, such as the overall call duration, the number of outgoing calls made at a certain day and the like. In the same manner, the control server 114 is operable to maintain call statistics and generate numerous reports, such as reports on calls per user, call duration, called numbers and the like.

It will be recalled that in some embodiments of the present invention, the voice communication network 106 can comprise a packet-based network, such as an Internet Protocol (IP) network. In these embodiments, the connection between the communication device 104 and the control server 114 (depicted as the signal G1) can be established using SIP signalling. The connection between the control server 114 and the destination party 602 (depicted as signal G2) can likewise be established using SIP signalling.

Figure 6H:
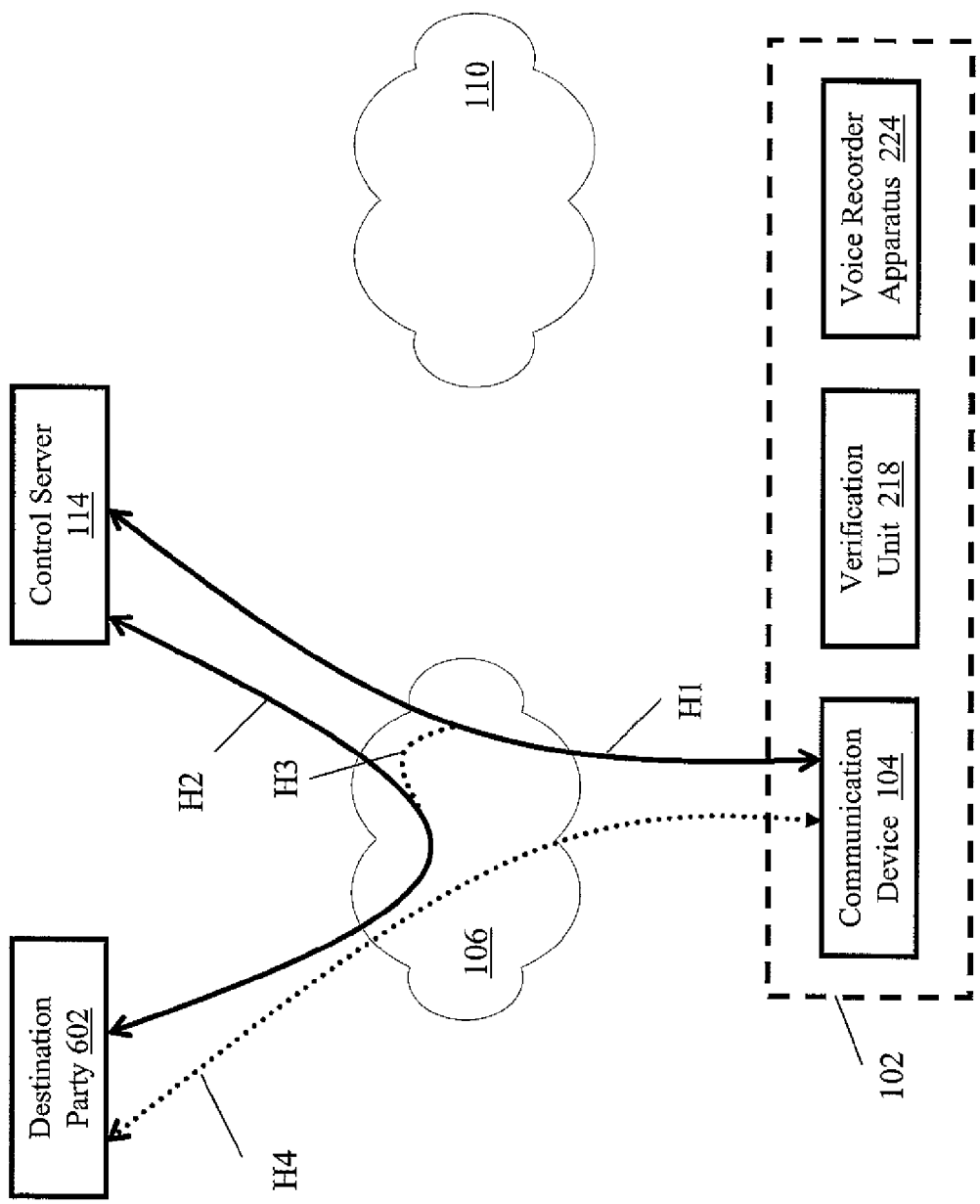

With reference to FIG. 6H a logical diagram representing signal flow between components of system 100 during a call connection stage according to another embodiment of the present invention is depicted. In this embodiment, the connection between the communication device 104 and the control server 114 is established as described previously with reference to FIGS. 6A-6D, depicted in FIG. 6H as signal H1. The control server 114 establishes a connection with the destination party 602, depicted as signal H2. When the destination party 602 accepts the call, the call between the communication device 104 and the control server 114 (depicted as signal H1) and the call between the control server 114 and the destination party 602 (depicted as signal H2) are merged (depicted as logical signal H3). In one specific non-limiting example, the calls are connected using the release link trunk function of the DMS-100 located in the voice communication network 106 (not depicted) known to those skilled in the art. As such, the control server 114 establishes a direct connection between the communication device 104 and the destination party 602 (depicted in a dotted line as signal H4) and does not remain on the call between the two parties.

With reference to FIG. 6I a logical diagram representing signal flow between components of system 100 during a call recording decision stage according to an embodiment of the present invention is depicted. The call recording decision stage can be performed simultaneously with the call establishment and user identification stage (depicted in FIGS. 6A-6D) or at a suitable time thereafter. The control server 114 generates a voice recording trigger and transmits the voice recording trigger to the voice recorder apparatus 224 (depicted by a logical signal I2). It will be recalled that in a first exemplary embodiment, the control server 114 can verify whether the call should be recorded. In these embodiments, the logical signal I2 may contain one of a "record" and "do not record" instructions. In other exemplary embodiments, the voice recorder apparatus 224 can be responsible for verifying whether the call should be recorded. In these embodiments, the logical signal I2 may comprise one of the user identification 402, the first network identifier associated with the communication device 104, the destination information or a combination thereof to enable the voice recorder apparatus 224 to verify whether the call should be recorded. It should be understood, that the logical signal I2 may comprise a number of other components (for example but not limited to time for how long to keep the recording, etc.)

It should be understood that the signal flows performed during the call establishing and user identification stage (depicted in FIGS. 6A-6D), the signal flows performed during the user verification stage (depicted in FIGS. 6E and 6F), the signal flows performed during the call recording decision stage (depicted in FIG. 6I) and the signal flows performed during the call connection stage (depicted in FIGS. 6G and 6H) can be combined with each other according to the teachings provided herein. Furthermore, it is noted that signal flows performed during the user verification stage (depicted in FIGS. 6E and 6F) are optional.

The above description has been provided primarily using an example of a correctional facility. It should be understood that teachings of the present invention are applicable to any other facility. Furthermore, the examples provided have particularly referred to the use of a smart card to provide user identification 402. A person skilled in the art having regard to the teachings of this invention will appreciate the user identification can be obtained using retina scan, iris scan, fingerprint scan or any other biometric scans or another device, such as an RFID tag. Equally, the smart card information can be substituted or augmented with a PIN code supplied to each user or a voice pattern recognition system. The PIN and/or the voice print can be transmitted from the communication device 104 to the control server 114 via the voice communication network and, as discussed above, the control server 114 is operable to compare the PIN and/or the voice print to the information stored in the user profile 400 in order to identify and/or authorize the user.

It should be understood that in other embodiments of the present invention, the call control apparatus 228 may perform other checks or other call authorization functions. For example, the call control apparatus 228 can verify whether the destination information is a local or a long distance call and based on company policy in force in the facility 102 (which in these embodiments can be an organization) and user calling privileges can either reject or authorize the outgoing call.

It will be recalled that the voice communication network 106 and the data communication network 110 can be the same network, such as a packet based network (ex. Internet Protocol (IP) network). In these embodiments, the communication device 104 can establish a voice connection via the voice network interface 208 and the IP network and the verification unit 218 can establish a data connection via the data network interface 210 and the IP network. The communication device 104 and the verification unit 218 can be addressable by a single IP address on the IP network. In these embodiments, the first identifier and the second identifier can be ports associated with the voice network interface 208 and the data network interface 210.

Even though the call control apparatus 228 and the voice processing apparatus 226 have been described as separate apparatuses, it should be understood that they can be embodied in a single apparatus. It should be further understood, that various components of the control server 114 can all be embodied in a single apparatus.

It should further be understood that even though certain steps of method 500 have been described in terms of the call control apparatus 228 instructing the voice processing apparatus 226 to perform certain steps, the voice processing apparatus 226 can comprise the required logic to perform some of the steps on its own without being instructed by the call control apparatus 228.

The control server 114 has been described comprising a profile database 232. A person skilled in the art should appreciate that the profile database 232 can comprise two or more fully redundant profile databases 232 and the profile database 232 could be remote from the control server 114.

One should understand that the method and system described herein above can be equally used in an environment where it is desired to allow users to make collect calls. In this case, the verification unit 218 could be used to identify the user in order to authorize the destination information as described previously. Alternatively, the data connection via the data communication network could be used to communicate with an additional user interface associated with the communication device 104, such as for transmitting information to a display device associated with the communication device 104 (not shown). In this embodiment, the control server 114 can transmit information to the user of the voice communication device, such as call durations, advertising messages and the like. It may also be desirous to collect call statistics (such as call durations and the like) via the data connection.

Therefore, according to the teachings of the present invention a method, system and apparatus for communicating data associated with a user of a voice device are provided. Furthermore, the present invention enables organizations (such as businesses, correctional facility authority or the like) to control outbound calls from their facilities based on the data associated with the user of the voice device. The present invention further provides billing and call tracking capabilities.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method for controlling a voice recorder, the voice recorder for recording a voice session between an origination device and a destination device, the method executable at a computing apparatus coupled to the origination device and to the voice recorder; the method comprising:

receiving at least one of a user identifier associated with a user of the origination device and a destination identifier associated with the destination device;

generating a voice recording trigger using at least one of said user identifier and said destination identifier;

transmitting said voice recording trigger to the voice recorder to enable the voice recorder to control recording of the voice session between the origination device and the destination device.

2. The method of claim 1 further comprising determining an origination identifier associated with the origination device; and transmitting said origination identifier to the voice recorder with said voice recording trigger.

3. The method of claim 2, wherein said determining comprises establishing a connection between the origination device and the computing apparatus; and obtaining the origination identifier from the origination device during establishment of said connection.

4. The method of claim 3, wherein said origination identifier comprises a network identifier associated with the origination device.

5. The method of claim 4, wherein said network identifier is one of a telephone number and an Internet Protocol (IP) address.

6. The method of claim 4, wherein said network identifier is received as part of Caller Line ID information during said establishment of said connection.

7. The method of claim 4, wherein said network identifier is obtained from a header of an IP packet, the IP packet having been used for establishing said connection between the origination device and the computing apparatus.

8. The method of claim 1, wherein said receiving comprises receiving the user identifier associated with a user of the origination device.

9. The method of claim 8, wherein said receiving the user identifier comprises receiving from said origination device one of a personal identification code and a voice pattern of a voice of the user of the origination device.

10. The method of claim 8, wherein said origination device comprises a voice device and a data device; and wherein said receiving the user identifier comprises receiving the user identifier from said data device.

11. The method of claim 10, wherein said data device comprises at least one of a keypad, a user identification card reader, a fingerprint scanner, a hand print scanner, a retina scanner and a keystroke pattern analyzer; and wherein said user identifier comprises at least one of a personal identification code keyed into the keypad, user identification card identifier, a fingerprint scan, a hand print scan, a retina scan and a key stroke pattern respectively.

12. The method of claim 8, wherein said receiving further comprises receiving the destination identifier associated with the destination device.

13. The method of claim 1, wherein said receiving comprises receiving the destination identifier associated with the destination device.

14. The method of claim 13, wherein said receiving the destination identifier comprises receiving at least one DTMF signal from the origination device via a connection established between said origination device and said computing apparatus, said at least one DTMF signal representing the destination identifier.

15. The method of claim 1, wherein said generating a voice recording trigger comprises analyzing at least one of said user identifier and said destination identifier to determine whether the voice session should be recorded; and wherein said generating a voice recording trigger further comprises generating one of a record instruction and a not record instruction in response to said analyzing.

16. The method of claim 15, wherein said analyzing comprises comparing said user identifier and said destination identifier to a list of user identifiers whose calls to particular destination devices associated with particular destination identifiers are to be recorded.

17. The method of claim 15, wherein said analyzing comprises comparing said user identifier to a list of user identifiers whose calls are to be recorded.

18. The method of claim 15, wherein said analyzing comprises comparing said destination identifier to a list of destination identifiers to which calls are to be recorded.

19. The method of claim 1, wherein said generating a voice recording trigger comprises compiling within said voice recording trigger at least one of data associated with the user identifier and data associated with the destination identifier; and wherein said transmitting said voice recording trigger to the voice recorder renders said voice recorder operable to determine whether said voice session should be recorded based on the at least one of data associated with the user identifier and data associated with the destination identifier.

20. The method of claim 19, wherein said data associated with the user identifier comprises one of said user identifier and an indication of said user identifier, said indication of said user identifier having been derived from said user identifier.

21. The method of claim 19, wherein said data associated with the destination identifier comprises one of said destination identifier and an indication of said destination identifier, said indication of said destination identifier having been derived from said destination identifier.

22. A method for controlling a voice recorder, the voice recorder for recording a voice session between an origination device and a destination device, the method executable at a computing apparatus coupled to the origination device and to the voice recorder; the method comprising:
  receiving at least one of a user identifier associated with a user of the origination device and a destination identifier associated with the destination device;
  determining if the voice session should be recorded based on at least one of the user identifier and the destination identifier;
  in response to said determining if the voice session should be recorded, generating a voice recording trigger, the voice recording trigger for enabling the voice recorder to control recording of the voice session between the origination device and the destination device.

23. The method of claim 22, further comprising transmitting said voice recording trigger to the voice recorder.

24. The method of claim 23, further comprising:
  determining an origination identifier associated with the origination device; and
  transmitting said origination identifier to the voice recorder with said voice recording trigger.

25. The method of claim 22, wherein said determining if the voice session should be recorded comprises comparing said user identifier and said destination identifier to a list of user identifiers whose calls to particular destination devices are to be recorded.

26. The method of claim 22, wherein said determining if the voice session should be recorded comprises comparing said user identifier to a list of user identifiers whose calls are to be recorded.

27. The method of claim 22, wherein said determining if the voice session should be recorded comprises comparing said destination identifier to a list of destination identifiers to which calls are to be recorded.

28. The method of claim 22, wherein if said determining if the voice session should be recorded renders a positive result, said voice recording trigger comprises a record trigger.

29. The method of claim 22, wherein if said determining if the voice session should be recorded renders a negative result, said voice recording trigger comprises a do-not-record trigger.

30. The method of claim 22, wherein said generating a voice recording trigger comprises generating a voice recording trigger only if it is determined that the voice session should be recorded.

31. An apparatus for controlling a voice recorder, the voice recorder for recording a voice session between an origination device and a destination device, the apparatus comprising:
  a first interface operable to connect to the origination device;
  a second interface operable to connect to the voice recorder;
  a processing unit coupled to said first and second interfaces; said processing unit operable to:
    receive, via said first interface, at least one of a user identifier associated with a user of the origination device and a destination identifier associated with the destination device;
    generate a voice recording trigger using at least one of said user identifier and said destination identifier;
    transmit said voice recording trigger to the voice recorder via said second interface to enable the voice recorder to control recording of the voice session between the origination device and the destination device.

32. The apparatus of claim 31, wherein said first and second interfaces are the same.

33. The apparatus of claim 31, wherein said first and second interfaces comprise an Internet Protocol (IP) interface.

34. The apparatus of claim 31, wherein said first interface is for connection to a first network and said second interface for connection to said first network and to a second network.

35. The apparatus of claim 31, wherein said first interface is for connection to a voice communication network and said second interface is for connection to a data communication network.

36. The apparatus of claim 31, wherein said first interface is for connection to a voice communication network and to a data communication network; and said second interface is for connection to said data communication network.

37. The apparatus of claim 31, wherein said first and second interfaces are operable to connect to a data communication network.

38. The apparatus of claim 31, wherein said processing unit is further operable to:
  determine an origination identifier associated with the origination device; and to
  transmit said origination identifier to the voice recorder with said voice recrding trigger.

39. The apparatus of claim 38, wherein said processing unit is operable to obtain the origination identifier from the origination device via said first interface during establishment of a connection between said apparatus and said origination device.

40. The apparatus of claim 39, wherein said origination identifier comprises a network identifier associated with the origination device.

41. The apparatus of claim 40, wherein said network identifier is one of a telephone number and an Internet Protocol (IP) address.

42. The apparatus of claim 40, wherein said network identifier is obtained as part of Caller Line ID information during establishment of said connection.

43. The apparatus of claim 40, wherein said network identifier is obtained from a header of an IP packet header, the IP packet having been used for establishing a connection between the origination device and said apparatus via said first interface.

44. The apparatus of claim 31, wherein said processing unit is operable to receive the user identifier associated with a user of the origination device.

45. The apparatus of claim 44, wherein to receive the user identifier associated with a user of the origination device, the processing unit is operable to receive said user identifier via a connection between said origination device and said apparatus, said connection established via said first interface.

46. The apparatus of claim 45, wherein said user identifier comprises one of a personal identification code and a voice pattern of a voice of the user of the voice device.

47. The apparatus of claim 44, wherein said origination device comprises a voice device and a data device; and wherein said first interface is operable to connect to said data device; and wherein to receive the user identifier, the processing unit is operable to receive the user identifier from said data device.

48. The apparatus of claim 47, wherein said data device comprises at least one of a keypad, a user identification card reader, a fingerprint scanner, a hand print scanner, a retina scanner and a keystroke pattern analyzer; and wherein said user identifier comprises at least one of a personal identification code keyed into the keypad, user identification card identifier, a fingerprint scan, a hand print scan, a retina scan and a key stroke pattern respectively.

49. The apparatus of claim 44, wherein said processing unit is further operable to receive the destination identifier associated with the destination device.

50. The apparatus of claim 31, wherein said processing unit is operable to receive the destination identifier associated with the destination device.

51. The apparatus of claim 50, wherein to receive the destination identifier, the processing unit is operable to receive at least one DTMF signal representing the destination identifier.

52. The apparatus of claim 31, wherein to generate a voice recording trigger, the processing unit is operable to analyze at least one of said user identifier and said destination identifier to determine whether the voice session should be recorded; and wherein the processing unit is further operable to generate said voice recording trigger comprising one of a record instruction and a not record instruction to indicate to the voice recorder whether the voice session is to be recorded.

53. The apparatus of claim 52, wherein to analyze at least one of said user identifier and said destination identifier, the processing unit is operable to compare said user identifier and said destination identifier to a list of user identifiers whose calls to particular destination devices are to be recorded.

54. The apparatus of claim 52, wherein the processing unit is operable to analyze said user identifier; and wherein to analyze said user identifier, the processing unit is operable to compare said user identifier to a list of user identifiers whose calls are to be recorded.

55. The apparatus of claim 52, wherein the processing unit is operable to analyze said destination identifier; and wherein to analyze said destination identifier, the processing unit is operable to compare said destination identifier to a list of destination identifiers to which calls are to be recorded.

56. The apparatus of claim 31, wherein to generate a voice recording trigger, the processing unit is operable to compile into said voice recording trigger at least one of data associated with the user identifier and data associated with the destination identifier; and wherein said voice recording trigger renders said voice recorder operable to determine whether said voice session should be recorded based on the at least one of said data associated with the user identifier and said data associated with the destination identifier.

57. The apparatus of claim 56, wherein said data associated with the user identifier comprises one of said user identifier and an indication of said user identifier, said indication of said user identifier having been derived from said user identifier.

58. The apparatus of claim 56, wherein said data associated with the destination identifier comprises one of said destination identifier and an indication of said destination identifier, said indication of said destination identifier having been derived from said destination identifier.

59. A system for controlling recording of a voice session between an origination device and a destination device; the system comprising:
a voice recorder coupled to the origination device, said voice recorder operable to record the voice session;
a computing apparatus coupled to the origination device and to said voice recorder, the computing apparatus operable to:
receive at least one of a user identifier associated with a user of the origination device and a destination identifier associated with the destination device;
generate a voice recording trigger using at least one of said user identifier and said destination identifier;
transmit said voice recording trigger to said voice recorder;
said voice recorder being operable to:
receive said voice recording trigger from said computing apparatus; and
responsive to receipt of said voice recording trigger, to control recording of the voice session between the origination device and the destination device.

60. The system of claim 59, further comprising a data network connecting said computing apparatus and said voice recorder.

61. The system of claim 60, wherein said data network comprises one of a private data network and Internet.

62. The system of claim 59, wherein said voice recorder is located in a location different from said computing apparatus.

63. The system of claim 59, wherein said computing apparatus is further operable to:
determine an origination identifier associated with the origination device; and to
transmit said origination identifier to said voice recorder with said voice recording trigger.

64. The system of claim 63, wherein said computing apparatus is further operable to establish a connection with the origination device to obtain said origination identifier.

65. The system of claim 64, wherein said origination identifier comprises a network identifier associated with the origination device.

66. The system of claim 65, wherein said network identifier is one of a telephone number and an Internet Protocol (IP) address.

67. The system of claim 59, wherein said computing apparatus is operable to receive the user identifier associated with a user of the origination device.

68. The system of claim 67, wherein to receive the user identifier, the computing apparatus is operable to receive said user identifier via a connection between said origination device and said computing apparatus.

69. The system of claim 68, wherein said user identifier comprises one of a personal identification code and a voice pattern of a voice of the user of the voice device.

70. The system of claim 67, wherein said origination device comprises a voice device and a data device; and wherein to receive said user identifier, the computing apparatus is operable to receive said user identifier from said data device.

71. The system of claim 70, wherein said data device comprises at least one of a keypad, a user identification card reader, a fingerprint scanner, a hand print scanner, a retina scanner and a keystroke pattern analyzer; and wherein said user identifier comprises at least one of a personal identification code keyed into the keypad, user identification card identifier, a fingerprint scan, a hand print scan, a retina scan and a key stroke pattern respectively.

72. The system of claim 67, wherein the computing apparatus is further operable to receive the destination identifier associated with the destination device.

73. The system of claim 59, wherein said computing apparatus is operable to receive said destination identifier associated with the destination device.

74. The system of claim 59, wherein to generate a voice recording trigger, the computing apparatus is operable to analyze at least one of said user identifier and said destination identifier to determine whether the voice session should be recorded; and wherein the computing apparatus is further operable to generate the voice recording trigger comprising one of a record instruction and a not record instruction to indicate to the voice recorder whether the voice session is to be recorded.

75. The system of claim 74, wherein to analyze at least one of said user identifier and said destination identifier, the computing apparatus is operable to compare said user identifier and said destination identifier to a list of user identifiers whose calls to particular destination devices are to be recorded.

76. The system of claim 74, wherein to analyze at least one of said user identifier and said destination identifier, the computing apparatus is operable to compare said user identifier to a list of user identifiers whose calls are to be recorded.

77. The system of claim 59, wherein to generate a voice recording trigger, the computing apparatus is operable to compile into said voice recording trigger at least one of data associated with the user identifier and data associated with the destination identifier.

78. The system of claim 77, wherein said data associated with the user identifier comprises one of said user identifier and an indication of said user identifier, said indication of said user identifier having been derived from said user identifier.

79. The system of claim 77, wherein said data associated with the destination identifier comprises one of said destination identifier and an indication of said destination identifier, said indication of said destination identifier having been derived from said destination identifier.

80. The system of claim 77, wherein said voice recorder is operable to determine whether the voice session should be recorded based on said received voice recording trigger.

81. The system of claim 80, wherein said computing apparatus is further operable to:
determine an origination identifier associated with the origination device; and to
transmit said origination identifier to said voice recorder with said voice recording trigger.

82. The system of claim 81, wherein the origination device is a particular one of a plurality of origination devices, and wherein the origination identifier is a particular origination identifier associated with the particular origination device; and wherein said voice recorder is for recording a plurality of voice sessions supported by the plurality of origination devices; and wherein said voice recorder is operable to identify a particular voice session associated with the particular origination device based on the particular origination identifier received from the computing apparatus.

83. The system of claim 59, wherein said origination device and are located at a correctional facility; and wherein said computing apparatus is located at a location different from said correctional facility.

\* \* \* \* \*